United States Patent [19]
Kaneko et al.

[11] Patent Number: 5,975,046
[45] Date of Patent: Nov. 2, 1999

[54] EXHAUST-GAS TEMPERATURE RAISING SYSTEM FOR AN IN-CYLINDER INJECTION TYPE INTERNAL COMBUSTION ENGINE

[75] Inventors: Katsunori Kaneko, Okazaki; Kazunari Kuwabara, Ogaki; Hiromitsu Ando; Toshio Shudo, both of Okazaki, all of Japan

[73] Assignee: Mitsubishi Jidosha Kogyo Kabushiki Kaisha, Tokyo, Japan

[21] Appl. No.: 08/956,108

[22] Filed: Oct. 24, 1997

[30] Foreign Application Priority Data

Oct. 24, 1996 [JP] Japan ................................. 8-282640

[51] Int. Cl.$^6$ ............................. F02B 17/00; F01N 3/20; F01N 3/36
[52] U.S. Cl. ............................. 123/300; 60/284; 60/285
[58] Field of Search ................................. 123/299, 300, 123/305; 60/274, 284, 285, 286

[56] References Cited

U.S. PATENT DOCUMENTS

| | | | |
|---|---|---|---|
| 4,452,040 | 6/1984 | Kobashi | 60/274 |
| 5,207,058 | 5/1993 | Sasaki et al. | 60/284 |
| 5,343,702 | 9/1994 | Miyajima et al. | 60/285 |
| 5,479,775 | 1/1996 | Kraemer et al. | 60/274 |
| 5,642,705 | 7/1997 | Morikawa et al. | 123/300 |
| 5,826,425 | 10/1998 | Rossie Sebastiano et al. | 60/274 |

FOREIGN PATENT DOCUMENTS 4-183922   6/1992   Japan .
8-100638   4/1996   Japan .

*Primary Examiner*—Tony M. Argenbright

[57] ABSTRACT

An exhaust-gas temperature raising system for a spark-ignition, in-cylinder injection type internal combustion engine includes an electronic control unit. In case that the engine is in an operating condition where the exhaust-gas temperature is required to rise, on an occasion of a main-fuel injection in a compression stroke, the electronic control unit controls engine control parameters such as ignition timing and air-fuel ratio to cause a cool-flame-reaction product, which remains in a combustion chamber in a middle stage or a subsequent stage of an expansion stroke, to have a concentration close to an inflammable concentration limit, and then causes an additional fuel to be injected into the combustion chamber from the fuel injection valve in the middle stage or the subsequent stage of the expansion stroke. The cool-flame reaction of the additional fuel quickly occurs, and the concentration of the cool-flame-reaction product exceeds the inflammable concentration limit, so that the additional fuel is enflamed by self-inflammation. The energy produced by the combustion of the additional fuel is effectively utilized for raising in the exhaust-gas temperature.

10 Claims, 14 Drawing Sheets

(1 of 14 Drawing Sheet(s) Filed in Color)

ADDITIONAL FUEL INJECTION TIMING

ADDITIONAL FUEL INJECTION TIMING

ADDITIONAL FUEL INJECTION TIMING

EXHAUST-GAS TEMPERATURE RAISING SYSTEM FOR AN IN-CYLINDER INJECTION TYPE INTERNAL COMBUSTION ENGINE

BACKGROUND OF THE INVENTION

1. Technical Field of the Invention

The present invention relates to an in-cylinder injection type internal combustion engine adapted to inject fuel directly into a combustion chamber and to cause the injected fuel to be spark-ignited for stratified combustion. More specifically, the present invention is directed to a system for raising the temperature of exhaust gas when an exhaust-gas purification device of an internal combustion engine is in an inactivated state, e.g., at the time of engine operation in a cold state, or when the exhaust-gas purification device may fail to maintain its activated temperature, e.g., at the time of engine operation with a lean air-fuel ratio for stratified combustion.

2. Description of the Related Art

For spark-ignition type automotive internal combustion engines, various in-cylinder injection type gasoline engines, which directly inject fuel into a combustion chamber, unlike conventional intake-manifold injection type engines have been proposed. A typical in-cylinder injection type engine is arranged to inject fuel from a fuel injection valve into a cavity formed in the top of a piston of the engine, to thereby enable a lean air-fuel mixture to be burnt, reduce the emission of harmful exhaust-gas components, and improve the fuel consumption. However, if the engine performs such a lean-combustion operation through out the entire engine operating region, a deficient engine output may occur in some engine operating region. To obviate this, the in-cylinder injection type engine is arranged to switch the injection mode between a compression-stroke injection mode and an intake-stroke injection mode according to engine operating conditions such as engine load.

When the engine is in a low-load operating region, the compression-stroke injection mode is selected, in which fuel is injected mainly during compression stroke. In that injection mode, most of the fuel, injected toward the cavity formed at the top of the piston during compression stroke, stays in the cavity because of the action of a tumble flow, circling in the cavity, of intake air sucked into the combustion chamber during intake stroke. Therefore, even if such a small amount of fuel that makes the air-fuel ratio as large as, e.g., 40, as for the whole cylinder, is injected (compression-lean mode), an air-fuel mixture having an air-fuel ratio close to the stoichiometric air-fuel ratio is formed in the cavity around electrodes of a spark plug at ignition timing at which the piston approaches the spark plug. Hence, the inflammation of the air-fuel mixture by a spark may become possible. This permits a large amount of intake air to be supplied, together with exhaust gas recirculated in a large amount in term of exhaust-gas recirculation, into the cylinder in the compression-stroke injection mode, so that pumping loss is decreased and fuel consumption is greatly improved.

On the other hand, when the engine is in a medium- or high-load operating area, fuel is injected mainly during intake stroke, so that an air-fuel mixture with a uniform air-fuel ratio is formed in the combustion chamber. In the case where a uniform air-fuel mixture is formed in this manner, a large amount of fuel can be burnt without causing any misfire due to a local overrich around the spark plug, whereby the engine output required at the time of acceleration or during high speed running of a vehicle can be ensured.

At the time of cold start of engine, or during a low-load engine operation at a low ambient air temperature, an in-cylinder injection type internal combustion engine may take much time to activate a catalyst of an exhaust-gas purification device disposed in the exhaust passage of the engine. When the engine is operated in the compression-lean mode where a large amount of intake air is supplied into a cylinder, the flow rate of exhaust gas is high, and hence the exhaust-gas temperature tends to become low. Accordingly, the exhaust-gas purification catalyst may fail to maintain its activated temperature, if the engine is operated in the compression-lean mode even after the catalyst has once reached the activation temperature. To eliminate these problems, various methods are proposed for raising the exhaust-gas temperature to effect a rapid activation of catalyst.

For example, an in-cylinder injection type internal combustion engine proposed in JP-A-4-183922 operates a fuel injection valve during compression stroke of the engine to inject a main fuel into a combustion chamber, and actuates a spark plug to ignite the main fuel. Then, the fuel injection valve is operated again during expansion stroke or during an early stage of exhaust stroke in which the intake valve is kept closed, to thereby inject an additional fuel into the combustion chamber, and the spark plug is actuated again to ignite the additional fuel.

However, the proposed system is disadvantageous in that it requires a complicated ignition-control logic and that sufficient energy for the second ignition cannot be ensured because of the following reasons: Ordinarily, the main fuel injected during compression stroke is almost completely burnt during expansion stroke. Therefore, at the time of additional fuel injection, an amount of reactive chemical species which promote combustion of air-fuel mixture becomes small in the cylinder. On the other hand, great energy (such as heat, pressure, temperature energy) is required for combustion of fuel, e.g., gasoline, which is low in self-inflammation ability. By simply re-actuating the spark plug immediately after the injection of the additional fuel, as in the case of the above proposal, it is sometimes impossible to supply the ignition energy required for igniting the additional fuel. In this case, the additional fuel cannot sufficiently be burnt so that the exhaust-gas temperature cannot surely be raised, and hence the catalyst cannot be activated rapidly.

In order to obtain sufficient ignition energy to eliminate the just-mentioned problem, an igniter with a large capacity must be used, for instance. In this case, the igniter becomes larger in size and higher in cost.

The above-mentioned JP-A-4-183922 also discloses a technique for heating the catalyst to quickly raise the catalyst temperature up to the activation temperature by mixing an additional fuel with exhaust gas and actuating a spark plug disposed in the exhaust-gas passage. However, such an arrangement is disadvantageous in that it requires an increased number of component parts and is thus high-priced.

In this regard, JP-A-8-100638 proposes a method for permitting an additional fuel to be burnt without utilizing spark ignition. In the proposed method, a main fuel is injected during compression stroke of an engine, a spark plug is actuated to ignite the main fuel, and an additional fuel is injected during expansion stroke. A flame produced by the inflammation of the main fuel initiated upon spark-operation of the spark plug propagates to the additional fuel and causes the same to be burnt. By this method, the additional fuel can be burnt without the need of re-actuating the spark plug, and the combustion of the additional fuel causes the exhaust-gas temperature to be raised, to thereby shorten a time required for activation of the catalyst.

However, according to the proposed method, the additional fuel must be injected during that time period in which the additional fuel can surely be enflamed by the flame which propagates during the main combustion. Actually, in the proposed method, the injection timing of the additional fuel is set to a value falling within the range from, e.g., 10° to 80° ATDC in terms of crank angle. However, if the additional fuel is injected during an early stage of expansion stroke like this, part of the thermal energy produced at the time of combustion of the additional fuel is wasted for the work of expansion, so that an intended rise of the exhaust-gas temperature may not sufficiently be achieved. Furthermore, an amount of additional fuel must be increased in order to sufficiently raise the exhaust-gas temperature. This causes a drawback that the fuel consumption is further increased.

SUMMARY OF THE INVENTION

An object of the present invention is to provide an exhaust-gas temperature raising system for an in-cylinder injection type internal combustion engine, which system is capable of supplying and igniting an additional fuel without the provision of a special device therefor, and efficiently utilizing energy of combustion of the additional fuel for a rise in the exhaust-gas temperature.

According to the present invention, there is provided an exhaust-gas temperature raising system for an in-cylinder injection type internal combustion engine adapted to inject a main fuel directly into a combustion chamber from a fuel injection valve and to spark-ignite the injected main fuel for lean combustion.

The exhaust-gas temperature raising system of the present invention comprises: engine control means for controlling an engine control parameter such that concentration of a cool-flame-reaction product, produced during a process of combustion of the main fuel and remaining in the combustion chamber at a middle stage of or a subsequent stage of expansion stroke, approaches an inflammable concentration limit, when the engine is in an operating condition in which an exhaust-gas temperature is required to rise; and additional fuel control means for injecting an additional fuel from the fuel injection valve during the middle stage of or the subsequent stage of the expansion stroke such that concentration of an entire cool-flame-reaction product, including the cool-flame-reaction product remaining in the combustion chamber and a cool-flame-reaction product newly produced by a cool-flame reaction of the additional fuel, exceeds the inflammable concentration limit, when the control of the engine control parameter is made by the engine control means.

According to the exhaust-gas temperature raising system of the present invention, if the engine is in an operating condition in which a rise in exhaust-gas temperature is required, e.g., if the temperature of the exhaust-gas purification catalyst of the engine does not reach an activation temperature, an additional fuel is injected into the combustion chamber where part of the cool-flame-reaction product produced by the cool-flame reaction of the main fuel remains. A new cool-flame-reaction product is produced by a cool-flame reaction of the additional fuel. Consequently, the concentration of the cool-flame-reaction product in the combustion chamber exceeds the inflammable concentration limit, and the additional fuel is enflamed by self-inflammation. Thus, according to the present invention, the additional fuel can be enflamed, without operating an ignition device and without utilizing the flame produced during the combustion of the main fuel (main combustion). The additional fuel injection of the present invention is performed during a middle stage of or a subsequent stage of expansion stroke, as distinct from the prior art which carries out the additional fuel injection during an early stage of expansion stroke so as to inject the additional fuel into the flame produced by the main combustion. Therefore, according to the present invention, thermal energy produced by the combustion of the additional fuel is not wasted for the work of expansion in the engine, and is hence effectively used to raise the exhaust-gas temperature.

As is clear from the foregoing explanation, the present invention has been created on the basis of the recognition, proper to the present inventors, that it is effective to perform the additional fuel injection during a middle stage of or a subsequent stage of expansion stroke, in order to efficiently use the energy of combustion of the additional fuel for a raising exhaust-gas temperature.

The present inventors have reached the above-mentioned recognition through the considerations and experiments described below.

In an internal combustion engine equipped with an exhaust-gas temperature raising system, typically, an amount of main fuel (generally, gasoline), such as to make the whole air-fuel ratio to be fuel-lean than the stoichiometric air-fuel ratio, is injected into a combustion chamber at the crank angle position of, e.g., CA1 in FIG. 2 during compression stroke. The main fuel is mixed with intake air which was sucked into the combustion chamber before the main fuel injection, and is held in a cavity formed in the top of a piston by the action of a tumble flow, circling in the cavity, of the intake air.

When the main fuel is mixed with the intake air, a cool-flame reaction (no flame may be produced), accompanied with no heat generation, takes place. The cool-flame reaction produces reactive chemical species (cool-flame-reaction product), such as peroxide, formaldehyde or the like (for example, CHO, $H_2O_2$, OH), which promote a chain branching reaction. The cool-flame reaction is promoted when the air-fuel mixture is compressed or is exposed to a high temperature.

As shown in FIG. 2, the pressure Pe in a cylinder gradually increases relatively slow as the piston moves toward the cylinder head, during the time period from the time of main fuel injection (crank angle position CA1) to the ignition timing (crank angle position CA2). During that period, the air-fuel mixture is heated by adiabatic compression in the cylinder, and accordingly, as shown in FIG. 3, the concentration of the cool-flame-reaction product slowly and gradually increases. FIG. 3 shows the concentration of the cool-flame-reaction product, observed at a specific position (in a rich air-fuel mixture portion) around the spark plug, as a function of crank angle.

The spark plug is actuated at the crank angle position of, e.g., CA2 in FIG. 2 before the piston reaches top dead center. At the ignition timing, a rich air-fuel mixture having an air-fuel ratio close to the stoichiometric air-fuel ratio is formed around the spark plug in the combustion chamber, and a lean air-fuel mixture is formed around the rich air-fuel mixture, as shown at the upper-left portion of FIG. 1, to which the label "formation of air-fuel mixture" is attached. When the spark plug is operated in the stratified-charge state (as shown at the portion of FIG. 1 labeled as "ignition"), a flame kernel is formed near the electrodes of the spark plug. Then, being triggered by the formation of the flame kernel, the cool-flame reaction quickly progresses around the electrodes of the spark plug (as shown at the portion "progress of cool-flame reaction" in FIG. 1). Consequently, an amount of the cool-flame-reaction product quickly increases.

When the amount of cool-flame-reaction product further increases to the extent that the concentration of the cool-flame-reaction product in the combustion chamber exceeds a certain equilibrium concentration (inflammable concentration limit) INTD (at the time point of CA3 in FIG. 3), the cool-flame reaction starts to progress exponentially or explosively, and a flame (hot flame) is generated, as shown at the upper-right portion "generation of flame" of FIG. 1. That is, the rich air-fuel mixture around the spark plug is enflamed.

If the air-fuel mixture fires in this manner, accompanied with chemical reaction and heat release, the in-cylinder pressure Pe quickly increases, as shown by the solid line in FIG. 2. The "DZ area" in FIG. 2 shows the crank angle area from ignition to inflammation. By the way, in a case where the air-fuel mixture is not enflamed, the in-cylinder pressure Pe increases slightly, as shown by the broken line in FIG. 2, as the piston moves in the direction of compression.

In case that the air-fuel mixture is enflamed, a shift is made from the cool-flame reaction process to a hot flame reaction process. At positions where the hot flame reaction takes place, the concentration of the cool-flame-reaction product quickly decreases, whereas the concentration of the final products, such as $CO_2$, $H_2O$, and unburnt hydrocarbons THC (Total Hydrocarbons), quickly increases, as shown by the broken line in FIG. 3. Furthermore, at positions adjacent to the positions where the hot flame reaction has occurred, heat generated by chemical reaction is supplied from the hot flame to the rich air-fuel mixture. Consequently, at the adjacent positions, the cool-flame reaction of the rich air-fuel mixture starts, to quickly increase the concentration of the cool-flame-reaction product, whereby the hot flame reaction is started. Thus, the area of the hot flame reaction spreads outward, so that the flame or flame front propagates (as shown by the lower-left portion "flame propagation" in FIG. 1). Consequently, the in-cylinder pressure Pe quickly increases as shown in FIG. 2.

Thereafter, the flame front reaches the boundary between the rich air-fuel mixture and the lean air-fuel mixture, but the flame does not propagate to the lean air-fuel mixture, so that the flame propagation stops. Since heat generated by the chemical reaction in the rich air-fuel mixture (area of hot flame reaction) is supplied to the lean air-fuel mixture, a slow cool-flame reaction of the lean air-fuel mixture is initiated, and continues thereafter (as shown by the portion labeled as "continuance of cool-flame reaction" in FIG. 1). The in-cylinder pressure Pe quickly decreases as shown in FIG. 2.

FIG. 4 shows, as a function of crank angle, the concentration of the cool-flame-reaction product observed at a specific position in the lean air-fuel mixture while an engine control of the present invention for raising the exhaust-gas temperature (exhaust-gas temperature raising control) was carried out, in which air-fuel ratio and ignition timing, for instance, were controlled. As is clear from FIG. 4, during the time period (crank angle area labeled as "WZ area" in FIG. 2) from a middle stage to a subsequent stage of expansion stroke in which the combustion of the rich air-fuel mixture already finished, the concentration of cool-flame-reaction product in the lean air-fuel mixture can be maintained at a high level close to the inflammable concentration limit, if the exhaust-gas temperature raising control is carried out. That is, even after the combustion of main fuel (main combustion), a considerable amount of cool-flame-reaction product can be left in the cylinder.

If an additional fuel is injected in this state (at the time CA4 in FIGS. 2 and 4), the additional fuel is exposed to high temperature atmosphere in the cylinder, and the cool-flame reaction of the additional fuel quickly progresses, whereby cool-flame-reaction product is newly produced. As is apparent from FIG. 4, just after the additional fuel injection, the concentration of the whole cool-flame-reaction product (more specifically, the concentration at the above-mentioned specific position in the lean air-fuel mixture), including the cool-flame-reaction product newly produced upon injection of the additional fuel and the cool-flame-reaction product remaining in the cylinder after the main combustion, exceeds the inflammable concentration limit. Consequently, the additional fuel starts self-inflammation (as shown by the lower-right portion "self-inflammation of additional fuel" in FIG. 1). That is, the additional fuel can be enflamed without using spark ignition.

The foregoing explanation can be summarized as follows: By controlling the concentration of the cool-flame-reaction product in the combustion chamber just before the additional fuel injection to be a value close to the inflammable concentration limit, and by controlling the concentration of the cool-flame-reaction product in the combustion chamber just after the additional fuel injection to a value exceeding the inflammable concentration limit, the additional fuel can be enflamed by self-inflammation, even if the additional fuel is injected during a middle stage of or a subsequent stage of expansion stroke in which stage the combustion of the rich air-fuel mixture around the spark plug already finished. That is, in order to enflame the additional fuel, it is unnecessary to re-actuate the spark plug, or to inject the additional fuel during the flame propagation (during an early stage of expansion stroke). In comparison with the prior art, in which the additional fuel is injected during the flame propagation, the ratio of that part of energy of combustion of the additional fuel, which is spent for the work of expansion to the whole combustion energy of the additional fuel, can be decreased, and hence the combustion energy of the additional fuel can effectively be utilized for raising the exhaust-gas temperature.

In order to examine the requirements for raising the exhaust-gas temperature, the present inventors carried out the following experiments:

In a first experiment, the injection quantity of the main fuel was set to a value, which made the air-fuel ratio at the time of main fuel injection equal to 30, and the total injection quantity of the additional fuel and main fuel was set to a value, which made the whole air-fuel ratio equal to the stoichiometric air-fuel ratio (14.7), while maintaining the quantity of intake air at constant. Further, the ignition timing TRD, as an engine control parameter, was set to compression top dead center. During engine operation in the experiment, the injection quantities of the main fuel and additional fuel and the ignition timing were respectively controlled to the set values, and the injection timing of additional fuel, as another engine control parameter, was changed from 30° to 110° after compression top dead center in terms of crank angle, and the exhaust-gas temperature and the concentration of unburnt hydrocarbon in exhaust gas were measured for every additional fuel injection timing. Furthermore, similar experiments were performed, with the ignition timing TRD set to 5°, 10°, and 15° before compression top dead center, respectively. In the following explanation, the compression top dead center, before the compression top dead center, and after the compression top dead center are referred to as TDC, BTDC, and ATDC, respectively.

In a second experiment, the injection quantity of the main fuel was set to a value which made the whole air-fuel ratio equal to 40. In other words, the main fuel injection quantity was less than that in the first experiment, and the rich air-fuel mixture portion formed around the spark plug during the process "formation of air-fuel mixture" shown at the upper-left portion of FIG. 1 was made smaller. Experimental conditions other than the main fuel injection quantity were the same to those in the first experiment. In the second experiment, the exhaust-gas temperature was measured, while changing the additional fuel injection timing within the range from 30° to 110° in terms of crank angle, with the ignition timing TRD set to TDC. Furthermore, similar experiments were performed, with the ignition timing TRD set to 5° BTDC and 15° BTDC, respectively.

FIG. 5 is a graph, prepared based on results of the first experiment, shows the exhaust-gas temperature as a function of additional fuel injection timing and ignition timing TRD. FIG. 6 is a graph similar to FIG. 5, prepared on the basis of results of the second experiment. FIG. 7 is a graph, prepared on the basis of results of the first experiment, shows the exhaust-gas temperature and the concentration of unburnt hydrocarbon in exhaust gas as a function of ignition timing TRD and additional fuel injection timing.

As is clear from the experimental results shown in FIGS. 5 to 7, two peaks appear in exhaust-gas temperature while the additional fuel injection timing changes from 30° to 110° after compression top dead center. The first peak appears when the additional fuel injection timing is set to a value falling within an early stage of expansion stroke (in the vicinity of 45° ATDC in terms of crank angle), and the second peak appears when the additional fuel injection timing is set to a value falling within a middle stage of or a subsequent stage of expansion stroke (in the vicinity of 90° to 100° ATDC in terms of crank angle).

It is considered that the reason why the exhaust-gas temperature is lowered, while the additional fuel injection timing is changed from 45° ATDC to 65° ATDC in terms of crank angle, is that the additional fuel quantity, which is not burnt and is discharged as THC (Total Hydrocarbons), increases in the just-mentioned area of additional fuel injection timing.

Furthermore, FIGS. 5 to 7 show that the second peak generally exceeds the first peak. It is considered that the reason for this resides in that the ratio of that combustion energy portion, which is spent for the work of expansion to the whole combustion energy of the additional fuel observed in a case where the additional fuel is injected during a middle stage of or a subsequent stage of expansion stroke, is less than that observed in a case where the additional fuel is injected during an early stage of expansion stroke. That is, by injecting the additional fuel during a middle stage of or a subsequent stage of expansion stroke, the combustion energy of the additional fuel can effectively be converted into the energy for raising the exhaust-gas temperature, and hence the additional fuel quantity can be decreased.

As apparent from the experimental results shown in FIGS. 5 to 7, a rise in exhaust-gas temperature becomes greater as the main fuel ignition timing TRD is more delayed toward the TDC. It is considered that the reason for this resides in that, if the ignition timing TRD is delayed, then the main combustion becomes slow, and the propagation of flame front is delayed. As a result, before the flame front fully propagates, the in-cylinder pressure is lowered and the flame extinguishes. In this case, according to the present inventors' view, the concentration of the cool-flame-reaction product increases and the rate of combustion of the additional fuel increases, whereby a large exhaust-gas temperature raising effect is obtained.

Furthermore, as is clear from the comparison between the experimental results shown in FIGS. 5 and 6, as for the cases where the ignition timing TRD is set to TDC, 5° BTDC, and 15° BTDC, respectively, a larger temperature-raising effect can be obtained when the main fuel injection quantity is set to a value which makes the whole air-fuel ratio equal to 40, than the effect obtainable in the case when the quantity is set to a value making the whole air-fuel ratio equal to 30. It is considered that the reason for this resides in that, if the air-fuel ratio at the time of the main combustion is made lean, a slow main combustion takes place, and hence a result similar to that in the case where the ignition timing is delayed is obtained.

The experimental results shown in FIGS. 5 to 7 indicate that, if the ignition timing is delayed or if the air-fuel ratio is made lean on an occasion that the engine operation for raising the exhaust-gas temperature is made, then the exhaust-gas temperature raising effect can be improved and the emission of THC can be decreased. When considering the results of measurements shown in FIGS. 3 and 4 in respect of the concentration of cool-flame-reaction product in a combustion chamber, together with the experimental results shown in FIGS. 5 to 7, it is clear that, by making the ignition timing delayed or by making the air-fuel ratio lean, it is possible to cause a considerable amount of cool-flame-reaction product to remain in a combustion chamber at the time just before the additional fuel injection is made in a middle stage of or a subsequent stage of expansion stroke, and it is possible to cause the concentration of the cool-flame-reaction product observed just after the additional fuel injection to exceed the inflammable concentration limit. It is considered that the combustion of the main fuel becomes slow if the ignition timing is delayed or if the air-fuel ratio is made lean. Accordingly, by other methods which can make the combustion of the main fuel slow, the exhaust-gas temperature raising effect can be obtained.

More specifically, in order to improve the exhaust-gas temperature raising effect, it is preferable, in view of the experimental results of FIGS. 5 to 7, to set the additional fuel injection timing at a value falling within the range from 70° ATDC to 110° ATDC (more preferably, 80° ATDC to 100° ATDC) in terms of crank angle where the cool-flame-reaction product increases. The range from 70° ATDC to 110° ATDC corresponds to a middle stage of or a subsequent stage of expansion stroke.

According to the experimental results shown in FIGS. 5 to 7 and the present inventors' consideration thereon, in order to improve the exhaust-gas temperature raising effect, it is preferable to set the ignition timing to a value falling within the range from 10° BTDC to 5° ATDC in terms of crank angle by using engine control means which includes ignition timing setting means, to thereby delay the ignition timing for the main fuel so that the main fuel may be burnt slowly.

To improve the stability of stratified combustion (main combustion), it is preferable to set the ignition timing to a value falling within the range from 5° BTDC to TDC. In this case, it is preferable that the air-fuel ratio at the time of stratified combustion is set to a value not less than 25 by using engine control means including air-fuel ratio control means, so that the main fuel may be burnt slowly. More preferably, in order to further improve the stability of stratified combustion (main combustion), the air-fuel ratio at the stratified combustion should be set to approximately 30 to 40. In this case, the exhaust-gas temperature raising effect can be obtained without delaying the ignition timing.

At any rate, with use of engine control means including at least either ignition timing setting means or air-fuel ratio control means, a required rise in exhaust-gas temperature can be achieved, while the engine is in an operating condition of requiring the exhaust-gas temperature raising, by controlling the ignition timing to the delay side or by controlling the air-fuel ratio to the lean side relative to the ignition timing or the air-fuel ratio for the engine control (stratified combustion control) performed in an engine operating condition of requiring no exhaust-gas temperature raising.

The present inventors observed a flame appearing at an exhaust manifold outlet of an engine when an additional-fuel injection was carried out following a main-fuel injection. In this experiment, the engine was operated at a speed of 1500 rpm under no-load. Main fuel in an amount of making an air-fuel ratio equal to 30 was injected at injection timing of 57° BTDC and spark-ignited at ignition timing of 15° BTDC, and additional fuel was injected in an amount of making a total air-fuel ratio, associated with both the main-fuel injection and the additional-fuel injection, equal to 14.7. The additional-fuel injection timing was set to 90° ATDC belonging to a middle stage of expansion stroke. In this case, a blue flame was observed at the exhaust manifold outlet, as shown at lower-right part in FIG. 17 to which label "Invention" is attached.

Further, an engine operation similar to the aforementioned prior art was carried out, with the additional-fuel injection timing set to 30° ADTC belonging to an early stage of expansion stroke. In order to grasp affections of only the difference in additional-fuel injection timing, engine operating conditions other than the additional-fuel injection timing were intentionally made equal to those in the just-mentioned engine operation corresponding to the present invention. In the case of the latter engine operation corresponding to the prior art, a luminous flame was observed at the exhaust manifold outlet, as shown at lower-left part in FIG. 17 to which label "Prior Art" is attached.

The fact that a luminous flame was observed when the additional fuel was injected at the early stage of expansion stroke indicates that the additional fuel was enflamed by hot flame produced as the main fuel was burnt. On the other hand, the fact that a blue flame was observed when the additional fuel was injected at the middle stage of expansion stroke indicates that the additional fuel was self-enflamed. Consequently, FIG. 17 indicates a significant difference in inflammation mechanism of additional fuel between the present invention and the prior art. As mentioned above, combustion energy of the self-enflamed additional fuel is not wasted for expansion work and is effectively utilized for raising exhaust-gas temperature.

At upper part of FIG. 17, the exhaust-gas temperature and the unburnt hydrocarbon concentration in exhaust gas are shown as a function of additional-fuel injection timing.

The exhaust-gas temperature raising system of the present invention is suitable for an in-cylinder injection type internal combustion engine which is arranged to spark-ignite fuel injected from a fuel injection valve directly into a combustion chamber and cause the injected fuel to effect stratified combustion.

An in-cylinder injection type engine can be arranged to be operable in an intake-stroke injection mode where fuel is injected during intake stroke. In this case, either the intake-stroke injection mode or a compression-stroke injection mode where fuel injection is made during compression stroke is selected according to engine load. The intake-stroke injection mode may include an intake-stroke rich injection mode in which the quantity of fuel injection is set to a value which makes the whole air-fuel ratio equal to a rich air-fuel ratio or to the stoichiometric air-fuel ratio; and an intake-stroke lean injection mode in which the quantity of fuel injection is set to a value making the whole air-fuel ratio lean. In the intake-stroke lean injection mode, a lean combustion is performed by utilizing a turbulent flow of intake air.

The exhaust-gas temperature raising system of the present invention can be applied to an engine which is operable in either mode selected between the compression-stroke injection mode and the intake-stroke injection mode. In this case, it is preferable to operate the engine in the compression-stroke injection mode at the time of raising the exhaust-gas temperature.

The exhaust-gas temperature raising system of the present invention is applied to an internal combustion engine equipped with an exhaust-gas purification device. The exhaust-gas purification device may be equipped with either or both a three way catalyst, which has a three way function of purifying CO, HC, and NOx in exhaust gas, and a lean NOx catalyst for purifying mainly NOx during a stratified combustion or a lean combustion. The exhaust-gas purification device of a type having a three way catalyst disposed on the downstream side of a lean NOx catalyst is advantageous in that the purification of NOx in the lean NOx catalyst is not prevented by the three way catalyst, and in that CO and HC which are not sufficiently purified by the lean NOx catalyst can surely be purified by the three way catalyst. Furthermore, the exhaust-gas purification device may be of a type provided with only a lean NOx catalyst having a three way catalyst function.

BRIEF DESCRIPTION OF THE DRAWINGS

The file of this patent contains at least one drawing executed in color. Copies of this patent with color drawing (s) will be provided by the Patent and Trademark Office upon request and payment of the necessary fee.

DETAILED DESCRIPTION

With reference to the accompanied drawings, an exhaust-gas temperature raising system according to a first embodiment of the present invention and an in-cylinder injection type gasoline engine equipped with this system will be explained in detail.

Figure 8:
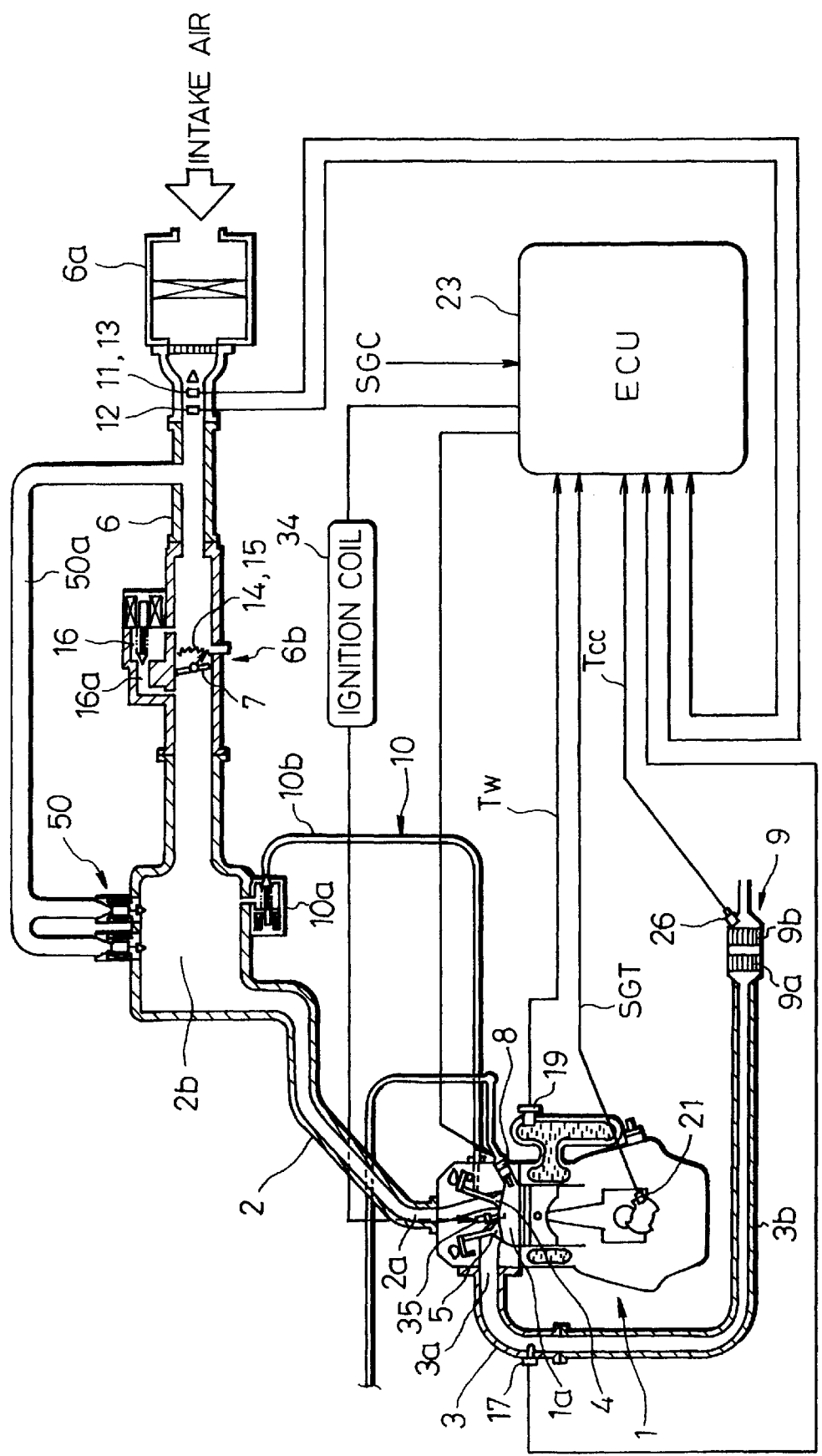
FIG. 8 is a schematic view showing an engine equipped with an exhaust-gas temperature rising system according to a first embodiment of the present invention.

In FIG. 8, reference numeral 1 indicates a spark ignition, in-cylinder injection type in-line four-cylinder automotive gasoline engine (hereafter referred to simply as an engine). The engine 1 is a four-cycle engine one operating cycle of which consists of intake stroke, compression stroke, expansion stroke, and exhaust stroke. The engine 1 has a combustion chambers 1a, intake system, an exhaust gas recirculation (EGR) system 10 and the like designed exclusively for in-cylinder injection.

Figure 10:
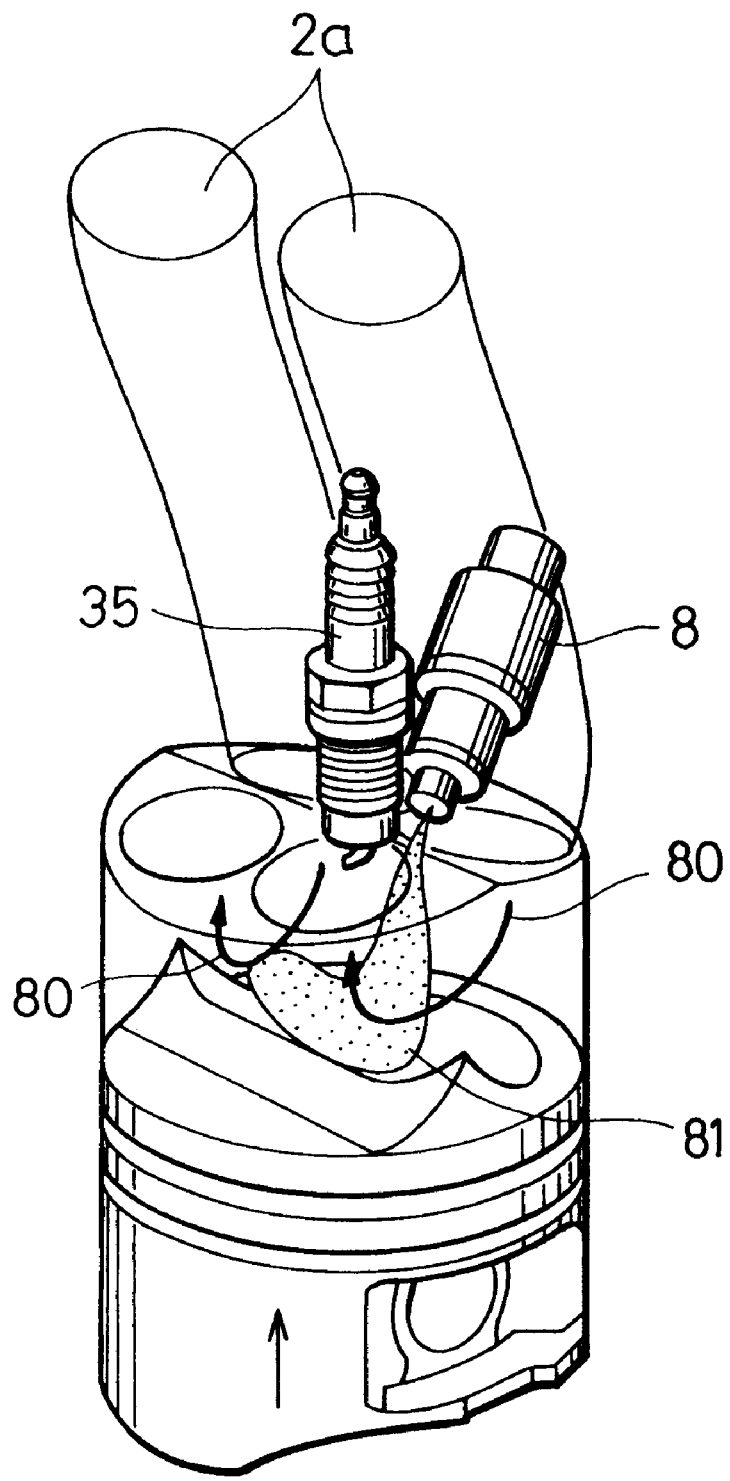
FIG. 10 is a fragmentary schematic view showing a form of fuel injection when an in-cylinder injection,spark-ignition type internal combustion engine operates in a compression-stroke injection mode.

A cylinder head of the engine 1 is fitted with an electromagnetic fuel injection valve 8 and a spark plug 35 for each cylinder, so that fuel may be injected from the fuel injection valve 8 directly into a combustion chamber 1a concerned. A hemispherical cavity (FIGS. 10 and 11) is formed in the top surface of a piston disposed in a cylinder for reciprocal motion therein. The cavity is located at a position to which fuel spray can reach if the fuel is injected from the fuel injection valve 8 when the piston reaches a reciprocal moving position thereof close to the top dead center. The theoretical compression ratio of the engine 1 is set to a value (in this embodiment, approximately 12) higher than that of an intake-manifold injection type engine. A DOHC four-valve system is employed as a valve driving mechanism. An intake-side camshaft and an exhaust-side camshaft for respectively driving an intake valve 9 and an exhaust valve 10 are rotatably held at an upper portion of the cylinder head.

The cylinder head is formed with intake ports 2a, each of which extends substantially upright between the camshafts. Intake air flow having passed through the intake port 2a can generate a reverse tumbling flow, mentioned later, in the combustion chamber 1a. Exhaust ports 3a extend substantially in the horizontal direction, as in the case of those of ordinary engines. A large-diameter EGR port, not shown, diverges diagonally downward from the exhaust port concerned. In FIG. 8, reference numeral 19 denotes a water temperature sensor for detecting a cooling water temperature Tw; 21, a crank angle sensor for outputting a crank angle signal SGT at predetermined crank positions (in this embodiment, 5° BTDC and 75° BTDC) for each cylinder; and 34, an ignition coil for supplying a high voltage to the spark plug 35. One of the camshafts, which rotate at half the speed of the crankshaft, is fitted with a cylinder discriminating sensor (not shown) for outputting a cylinder discriminating signal SGC, whereby the cylinder, for which the crank angle signal SGT is output, is discriminated based on the sensor signal SGC.

The intake ports 2a are connected, through an intake manifold 2 including a surge tank 2b, with an intake pipe 6 which is provided with an air cleaner 6, a throttle body 6b, and a stepper-motor type idle speed control valve (hereinafter referred to as idle control valve) 16. The intake pipe 6 is further provided with a large-diameter air bypass pipe 50a, bypassing the throttle body 6b, through which intake air is introduced to the intake manifold 2 and in which a large linear-solenoid type air bypass valve (ABV valve) 50 is disposed. The air bypass pipe 50a has a flow area substantially equal to that of the intake pipe 6, so that a quantity of intake air, required for low or medium speed range of the engine 1, can flow through the pipe 50a when the ABV valve 50 is fully open. The idle control valve 16 has a flow area smaller than that of the ABV valve 50 and is used to finely adjust the intake air amount.

The throttle body 6b is provided with a butterfly type throttle valve 7 for opening and closing the intake passage formed therein, a throttle position sensor 14 for detecting the throttle opening degree θth as accelerator opening degree, and an idle switch 15 for detecting a fully-closed state of the throttle valve. An intake air temperature sensor 12 and an atmospheric pressure sensor 13 for determining the density of intake air are disposed in the air cleaner 6a. These sensors deliver output signals indicating the atmospheric pressure Pa and the intake air temperature Ta, respectively. In the vicinity of the inlet of the intake pipe 6, a Karman's vortex type air flow sensor 11 is disposed and outputs a vortex occurrence signal which is proportional to the volumetric air flow rate Qa per one intake stroke.

The aforementioned EGR ports are connected to the downstream of the throttle valve 7 and the upstream of the intake manifold 2 through a large-diameter EGR pipe 10b in which a stepper-motor type EGR valve 10a is provided.

The exhaust ports 3a are connected to an exhaust manifold 3 provided with an $O_2$ sensor 17. An exhaust pipe (exhaust passage) 3b, which is provided with a catalyst converter 9 for purification of exhaust gas, a muffler (not shown) and the like, is connected to the exhaust manifold 3. The $O_2$ sensor 17 detects the oxygen concentration in exhaust gas, and outputs a detection signal. Attached; the downstream side of the catalyst 9 is a catalyst temperature sensor 26 for detecting the temperature Tcc of the catalyst or its vicinity (hereinafter referred to as catalyst temperature). The exhaust gas discharged from the combustion chamber 1a to the exhaust manifold 3 enters the catalyst converter 9 in which three harmful exhaust gas components CO, HC, and NOx are purified, and is then muffled by the muffler, to be discharged to the atmospheric air.

The catalyst 9, which is a combination of a lean NOx catalyst 9a and a three way catalyst 9b, is suitable for the engine 1 arranged to perform fuel-economy operation while controlling the air-fuel ratio to the fuel-lean side (lean side). The three way catalyst 9b purifies CO, HC, and NOx in exhaust gas when the engine operates at the stoichiometric air-fuel ratio. The lean NOx catalyst 9a purifies NOx in exhaust gas which cannot sufficiently be purified by the three way catalyst 9b when the engine operates with a lean air-fuel mixture. The three way catalyst 9b is positioned on the downstream side of the lean NOx catalyst 9a, and consequently, the purification of NOx in the lean NOx catalyst 9a is not interrupted by the three way catalyst 9b, and CO and HC, which cannot sufficiently be purified in the lean NOx catalyst 9a, can surely be purified in the three way catalyst 9b. By the way, if the lean NOx catalyst has a three way function, it is possible to provide the lean NOx catalyst only.

A fuel tank, not shown, is disposed at the rear of a vehicle body. Fuel supply from the fuel tank to the fuel injection valves 8 is carried out through a fuel supply system, not shown. Namely, fuel stored in the fuel tank is sucked up by means of a motor-operated lower pressure fuel pump, and is supplied to the engine 1 through a low-pressure feed pipe. The fuel supplied toward the engine 1 is fed into each fuel injection valve 8 through a high-pressure feed pipe and a delivery pipe by means of a high-pressure fuel pump which is attached to the cylinder head.

An ECU (electronic control unit) 23 is provided in a passenger cabin of the vehicle and includes an I/O unit, storage units (ROM, RAM, BURAM, etc.) used to store control program, control map and the like, central processing unit (CPU), timer counter, and the like. The ECU 23 conducts an overall control of the engine 1.

Various switches for detecting the operating states of an air conditioner, power steering device, automatic transmission and the like, that apply loads to the engine 1 when operated, are respectively connected to the input side of the ECU 23, which receives respective detection signals from these switches. In addition to the above-mentioned various sensors and switches, many switches and sensors (not shown) are connected to the input side of the ECU 23 the output side of which is connected to warning lights, pieces of equipment and the like.

In accordance with input signals supplied from the sensors and switches concerned, the ECU 23 determines fuel injection mode, fuel injection amount, fuel-injection termination timing, ignition timing, EGR gas introduction amount and the like, and then controls the fuel injection valves 8, the ignition coil 34, the EGR valve 10a and the like.

Next, an ordinary control of the engine 1 effected in a case where an exhaust-gas temperature raising control, described later, is not performed will be explained briefly.

At the start of the engine in a cold state, the ECU 23 selects the intake-stroke injection mode, and controls fuel injection to attain a relatively rich air-fuel ratio. The reason for doing this is that since the rate of vaporization of fuel is low when the engine is in a cold state, a misfire and emission of unburnt fuel components are unavoidable if the fuel injection is performed in the compression-stroke injection mode. Furthermore, the ECU 23 closes the ABV valve 50 during the engine start-up. In this case, intake air is supplied into the combustion chamber 1a through clearances between the throttle valve 7 and the peripheral wall of the intake pipe 6 and through the bypass passage where the idle control valve 16 is disposed. By the way, the idle control valve 16 and the ABV valve 50 are unitarily controlled by the ECU 23, and their valve opening degrees are determined according to an introduction quantity of intake air (bypass air) to be supplied, bypassing the throttle valve 7, to the engine.

After the start-up of the engine and until the cooling water temperature Tw rises up to a specified value, the ECU 23 selects the intake-stroke injection mode for fuel injection, as in the case of engine start-up, and keeps the ABV valve 50 closed. Furthermore, as in the case of an intake-manifold injection type engine, idle speed control is carried out by adjusting the opening degree of the idle control valve 16 in accordance with the engine load which increases and decreases with a change in the operating state of auxiliary machinery such as the air conditioner. The ABV valve 50 is also opened, if needed. When the $O_2$ sensor 17 reaches its activation temperature, the ECU 23 starts the air-fuel ratio feedback control according to the output voltage of the $O_2$ sensor 17, so that harmful exhaust gas components may be purified by the catalyst 9. As explained in the above, when the engine is in a cold state, the fuel injection control is performed in a manner similar to that for the intake-manifold injection type engine. Control response and control accuracy are high in the in-cylinder injection type engine 1 which entails no adhesion of fuel drops onto inner wall surfaces of intake ports.

Figure 9:
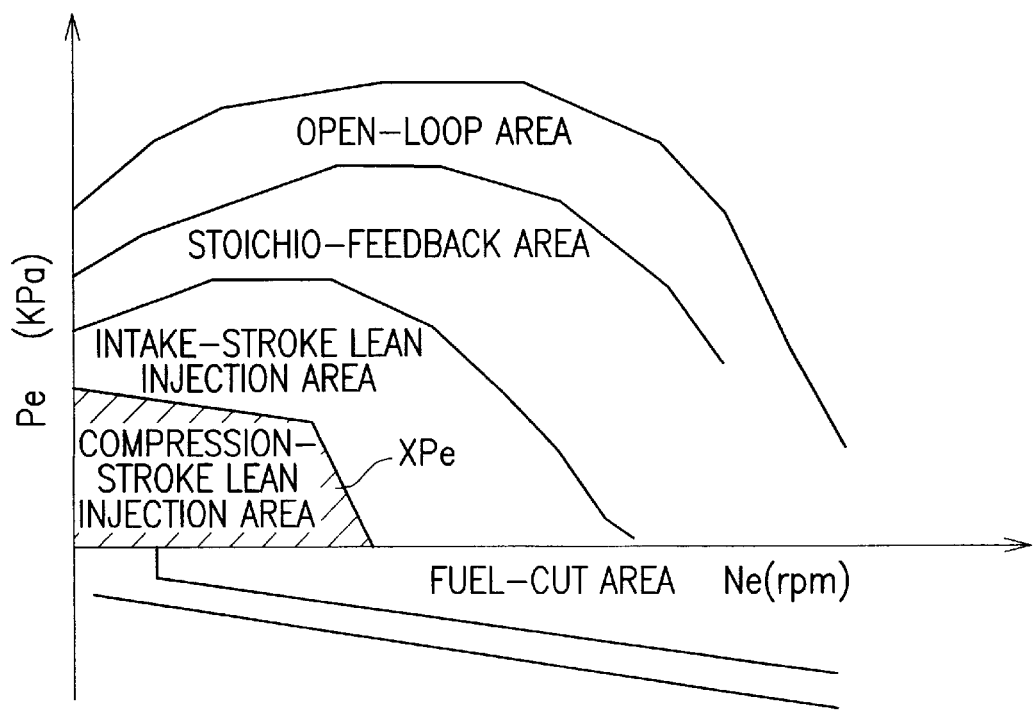
FIG. 9 is a map of engine control mode showing a compression-stroke lean injection area, intake-stroke lean injection area, stoichio-feedback area, and fuel-cut area, as a function of mean effective in-cylinder pressure Pe and engine speed Ne.

Upon completion of warming-up the engine 1, the ECU 23 retrieves a fuel-injection control region at the present time from the fuel-injection control map in FIG. 9 on the basis of engine speed Ne and target effective in-cylinder pressure (target load) pe determined by throttle opening θth or the like. Then, a fuel injection mode and a fuel injection quantity which are suitable for the present control area are determined, and the fuel injection valve 8 is driven. In addition, a control of opening degrees of the ABV valve 50 and the EGR valve 45 is carried out.

For example, when the engine is in a low-load, low-speed region, e.g., at the time of idle operation, the engine is operated in the compression-stroke lean injection region shown by the hatched area in FIG. 9. In this case, the ECU 23 selects the compression-stroke injection mode, controls the opening degrees of the ABV valve 50 and the EGR valve 10a according to the engine operating state, and controls the fuel injection to inject such a quantity of fuel as to make the air-fuel ratio lean (in the present embodiment, approximately 20 to 40). The intake air, sucked through the intake port 2a into the combustion chamber before the fuel injection, forms an inverse tumble flow 80, as shown by the arrow in FIG. 10. By the action of the inverse tumble flow, fuel spray 81 is retained in the cavity formed in the piston. Consequently, at ignition timing, an air-fuel mixture with an air-fuel ratio close to the stoichiometric air-fuel ratio is formed around the spark plug 35. After completion of warming-up of the engine, the vaporization rate of fuel is raised. Accordingly, even if the whole air-fuel ratio is made extremely lean (for example, approximately 50), the injected fuel is permitted to be enflamed. Because of the engine operation at such a lean air-fuel ratio, the emission of CO and HC becomes very small, and the emission of NOx can also be restrained to be low by exhaust-gas recirculation. Moreover, by opening the ABV valve 50 and the EGR valve 10a to supply large amounts of air and exhaust gas, the pumping loss is reduced. Because of the operation at the lean air-fuel ratio in cooperation with the reduction of pumping loss, the fuel consumption is largely improved. An idle speed control responsive to the increase and decrease of engine load is performed by increasing or decreasing the quantity of fuel injection, so that control response is also very high.

In the compression-stroke injection mode, the fuel injected from the injection valve 8 and transferred by the inverse tumble flow of intake air should reach the spark plug 35 and should vaporize before the ignition timing, so as to form an air-fuel mixture which can easily be ignited. If the whole or average air-fuel ratio is equal to or less than 20, overrich air-fuel mixture is locally produced around the spark plug, so that a so-called rich-misfire takes place. On the other hand, if the average air-fuel ratio is equal to or larger than 40, the air-fuel ratio exceeds a lean limit, so that a so-called lean-misfire tends to occur. Therefore, as mentioned below, the fuel-injection start timing, the fuel-injection termination timing, and the ignition timing are accurately controlled, and the average air-fuel ratio is set to a value falling within the range from 20 to 40. If it is necessary to supply such a quantity of fuel as to make the average air-fuel ratio equal to or less than 20, a shift is made to the intake-stroke injection mode.

When the engine runs at a low or middle speed, the engine is operated in the intake-stroke lean area or the stoichio feedback area (stoichiometric air-fuel ratio feedback control area) in FIG. 9. In that case, the ECU 23 selects the intake-stroke injection mode.

Figure 11:
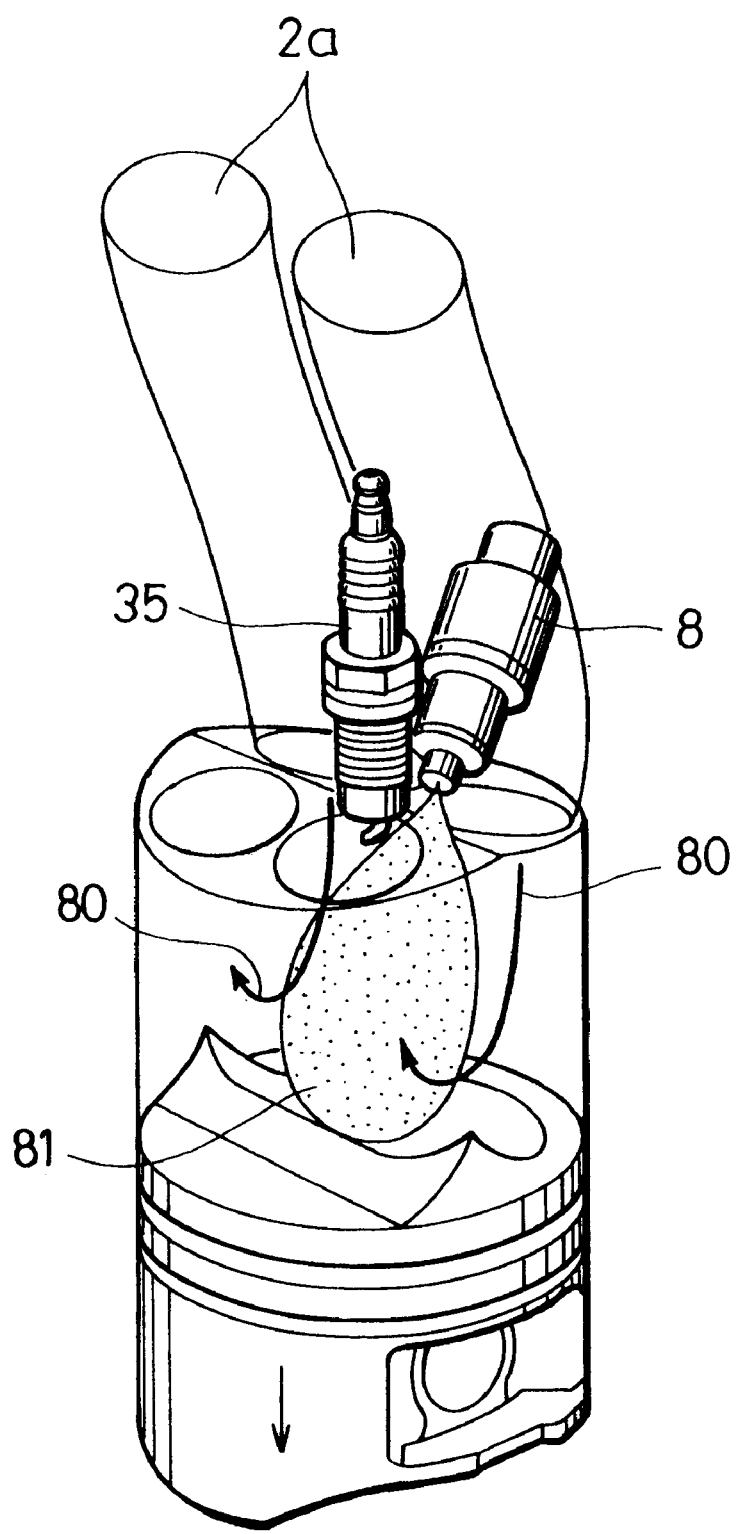
FIG. 11 is a view, similar to FIG. 10, showing a form of fuel injection when the engine operates in an intake-stroke injection mode.

More specifically, if the engine operating state represented by average effective pressure Pe and engine speed Ne belongs to the intake-stroke lean region, the intake-stroke lean injection mode is selected, and the opening degree of the ABV valve 50 and the quantity of fuel injection are controlled to attain a relatively lean air-fuel ratio (for example, approximately 20 to 23). In the intake-stroke lean injection mode, the intake air entering through the intake port 2a forms an inverse tumble flow 80 in the combustion chamber, as shown in FIG. 11, to produce a turbulence effect. Therefore, by controlling the fuel-injection start timing and the fuel-injection termination timing, inflammation of the mixture having such a lean air-fuel ratio is enabled.

When the engine operates in the stoichio-feedback region (S-FB area), the S-FB control mode is selected, and the EGR valve 10a is controlled to be opened and closed, with the ABV valve 50 kept closed (the EGR valve 10a is controlled only when the engine operates in a specified range of the S-FB area). In addition, the air-fuel ratio feedback control is performed according to the output voltage of the O2 sensor 17. In the S-FB area, a larger engine output is obtained for the reason that the engine operates at a high compression ratio, and harmful exhaust-gas components are purified by the catalyst 9, with the emission of NOx reduced by exhaust-gas recirculation.

When the engine is rapidly accelerated or runs at a high speed, the open-loop control area shown in FIG. 9 is entered. The ECU 23 selects the open-loop control mode (intake-stroke injection mode), closes the ABV valve 50, and controls fuel injection according to throttle opening θth, engine speed Ne and the like, to attain a relatively rich air-fuel ratio. On this occasion, a high engine output can be obtained for the reasons that the compression ratio is high, a stream of intake air forms the inverse tumble flow 80, and inertia effect is attained since the intake port 2a extends approximately upright relative to the combustion chamber 1a.

At the time of coasting engine operation while the engine runs at a middle or high speed, the fuel-cut region shown in FIG. 9 is entered. The ECU 23 completely stops the fuel injection, so that the fuel consumption is improved and the emission of harmful exhaust-gas ingredients is decreased. The fuel-cut operation is immediately stopped, if the engine speed Ne becomes lower than a restoration speed, or if the driver depresses the accelerator pedal.

Next, procedures of an exhaust-gas temperature raising control according to the present invention will be explained with reference to the flowchart shown in FIG. 12.

Figure 12:
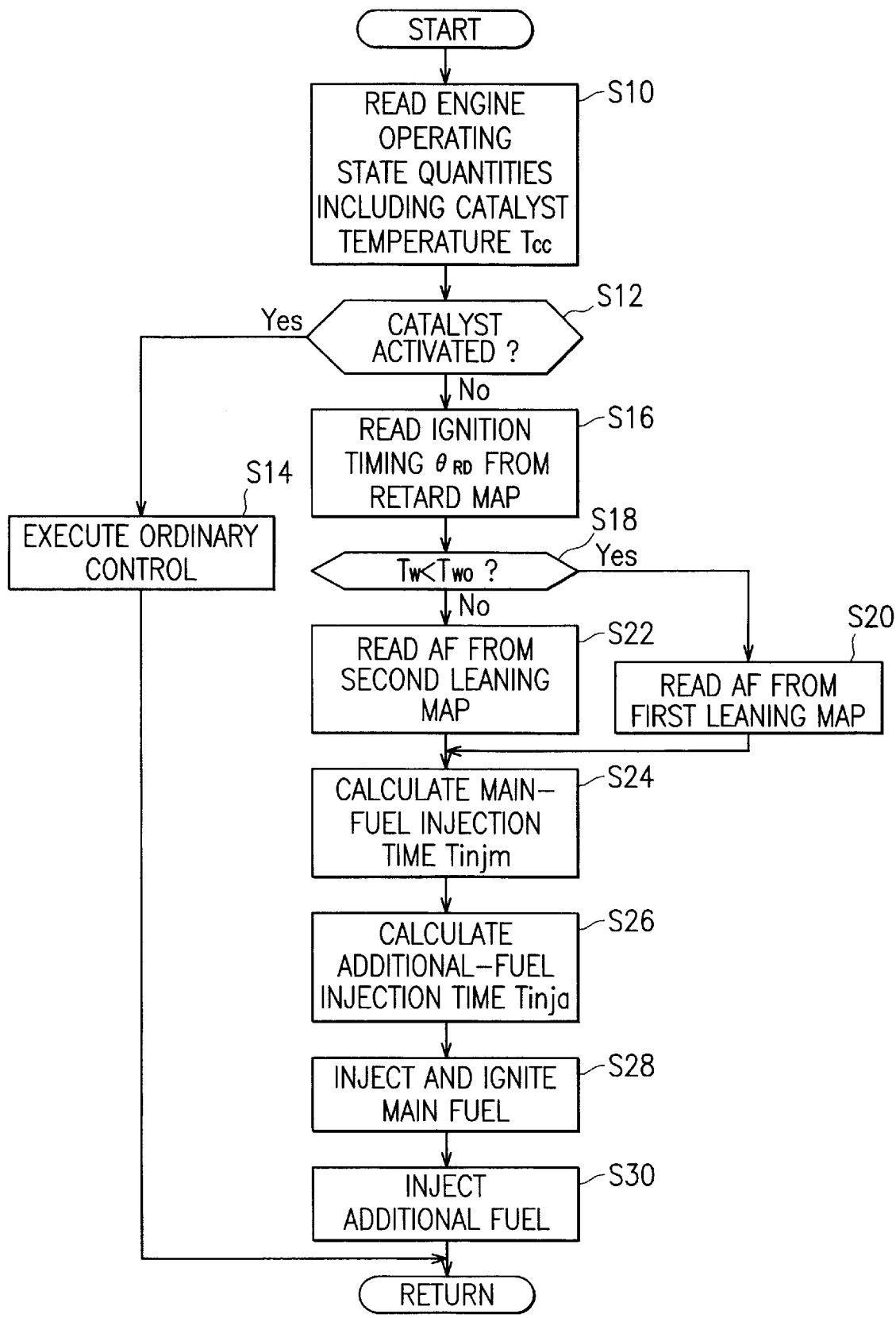
FIG. 12 is a flowchart showing procedures of an exhaust-gas temperature raising control according to the first embodiment of the present invention.

The exhaust-gas temperature raising control routine shown in FIG. 12 is executed each time a crank angle signal SGT is outputted from the crank angle sensor 21, while the above-mentioned ordinary engine control is carried out.

First, at step S10, the ECU 23 reads various engine operating state quantities respectively detected by various sensors, such as the catalyst temperature Tcc, engine cooling water temperature Tw, intake air flow rate Qa, throttle opening θth, engine speed Ne, atmospheric pressure Pa, and intake air temperature Ta. Then, the process advances to step 12, in which whether or not the catalyst 9 is in an active state is judged by judging whether or not the catalyst temperature Tcc detected by the catalyst temperature sensor 26 exceeds a catalyst-activity discrimination temperature $T_{cw}$. The temperature $T_{cw}$ is set in advance based on a lower limit temperature above which the catalyst is activated. The catalyst-activity discrimination temperature Tcw is set a value equal to, e.g., the sum of the lower limit temperature for catalyst activation and a specified temperature value. In the case of the lean NOx catalyst 9a of the present embodiment, the lower limit temperature for activation of the catalyst is approximately 400° C.

In the catalyst-activity discrimination at step S12, not only the determination as to whether or not the catalyst temperature Tcc exceeds the catalyst-activity discrimination temperature Tcw is made, but also a further determination as to whether a condition to prohibit the exhaust-gas temperature raising control is satisfied may be made.

The condition to prohibit the exhaust-gas temperature raising control is fulfilled when either or both of the following requirements (1) and (2) are not satisfied:

(1) engine speed Ne after completion of engine start exceeds a specified engine speed, or a time period (for example, about four seconds) normally required for the engine speed to be stabilized has elapsed from the time when the engine started; and (2) there is no substantial change in the operating state of air quantity control means (for example, the opening degree of throttle valve) during the exhaust-gas temperature raises control.

The reason why the exhaust-gas temperature rising control is prohibited when the operating state of air quantity control means changes is as follows:

If the operating state of the air quantity control means changes in the direction of increasing an air supply quantity, this indicates that an accelerated engine operation is requested. In that case, the quantity of fuel injection is increased, and hence the exhaust-gas temperature can be raised without the exhaust-gas temperature raising control. On the other hand, if the operating state of air quantity control means changes in the direction of decreasing the air quantity while the engine runs at a middle or high speed, fuel-cut control is performed to thereby stop the supply of a main fuel. In that case, an additional fuel cannot be burnt by simply supplying the additional fuel in an attempt to raise the exhaust-gas temperature. Furthermore, when the engine is in the fuel-cut region, a decelerated engine operation responsive to the driver's intention of decelerating the engine cannot be achieved, if the main fuel and the additional fuel are supplied.

In the following, explanations will be given for the case where both the catalyst activation temperature judgment and the judgment as for the condition to prohibit the exhaust-gas temperature raising control are made at step S12.

If the discrimination result at step S12 is affirmative (Yes), that is, if the catalyst temperature Tcc is higher than the catalyst-activity discrimination temperature Tcw or if the condition to prohibit the exhaust-gas temperature raising control is satisfied, then it is judged that the catalyst 9 is in an active state, or that it is unnecessary or unsuitable to make the exhaust-gas temperature raising control. In this case, the process advances to step S14.

At step S14, the above-mentioned ordinary engine control is performed. That is, only the main fuel injection is performed, with the additional fuel injection prohibited. More specifically, the ordinary engine control is carried out in the compression-stroke injection mode or in the intake-stroke injection mode according to the engine operating state.

On the other hand, if the discrimination result at step S12 is negative (No), that is, if the catalyst temperature Tcc is lower than the catalyst-activity discrimination temperature Tcw and if the condition to prohibit the exhaust-gas temperature raising control is not satisfied, it is judged that the catalyst 9 is in an inactive state and the exhaust-gas temperature raising control is permissible, and hence the exhaust-gas temperature raising control, mentioned in detail below, is carried out.

In the exhaust-gas temperature raising control, the main fuel injection is performed in the compression-lean mode, and the ignition timing is delayed. More specifically, at step S16, the ignition timing $\theta$ RD is read out from a retard map (not shown). The retard map is prepared in advance on the basis of experimental data similar to the experimental results of FIGS. 5 to 7, and stored in the memory of the ECU 23. More specifically, the ignition timing $\theta$ RD, associated with the main fuel injection, at the time of the exhaust-gas temperature raising control, is read out from the retard map according to catalyst temperature Tcc, target exhaust-gas temperature, engine cooling water temperature Tw and the like. Further, the ignition timing thus determined is subject to a correction according to the intake air density which is in turn determined according to atmospheric pressure Pa and intake air temperature Ta. At any rate, the ignition timing $\theta$ RD is set to a proper value falling within the range from 10° BTDC to 5° ATDC in terms of crank angle.

Next, at step S18, it is judged whether or not the cooling water temperature Tw detected by the water temperature sensor 19 is lower than a specified discrimination temperature Two (for example, 50° C.).

Figure 1:
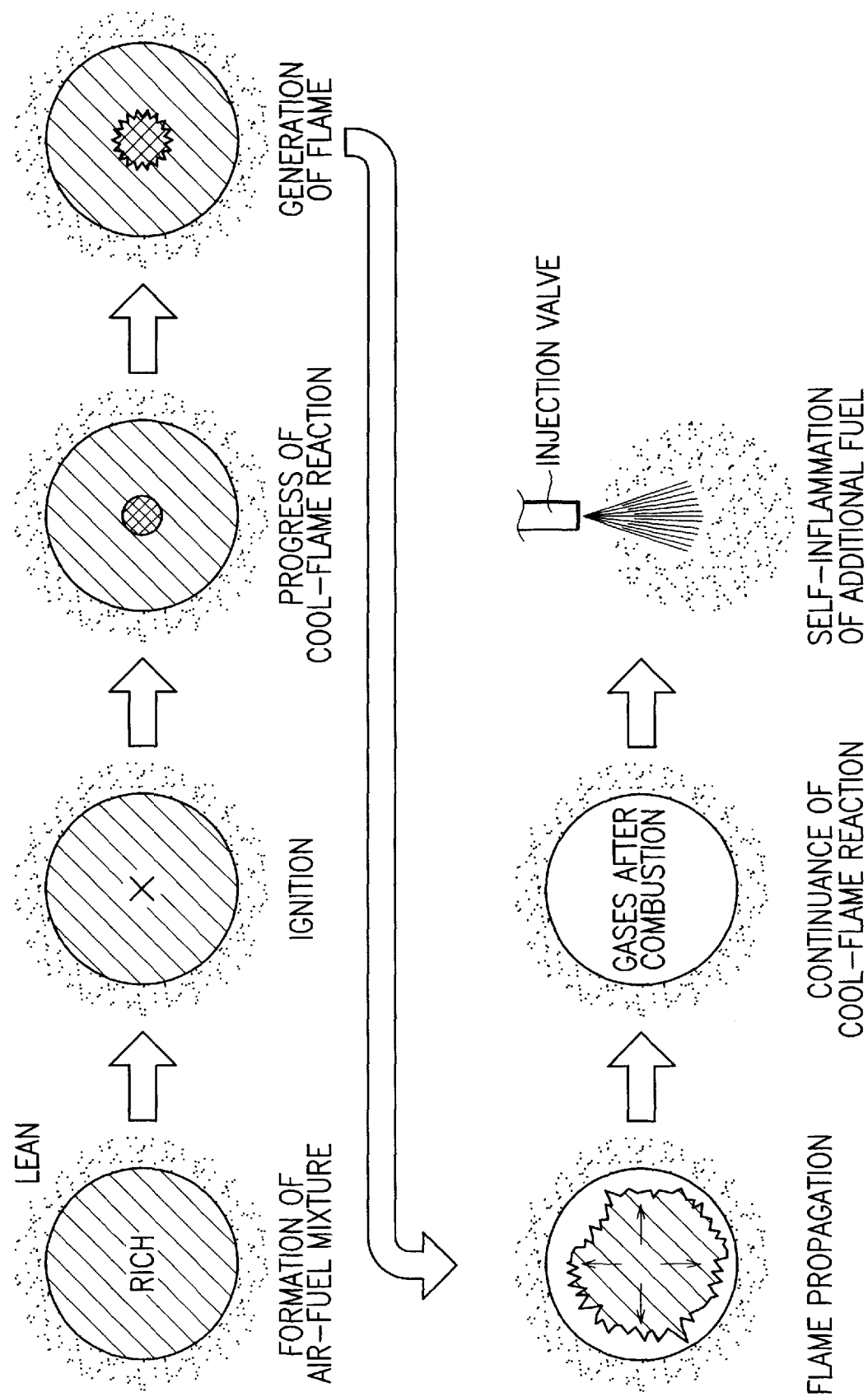
FIG. 1 is a depictive view showing the combustion process of a main fuel injected during compression stroke and showing the injection of an additional fuel effected in a middle stage of or a subsequent stage of expansion stroke.
Figure 2:
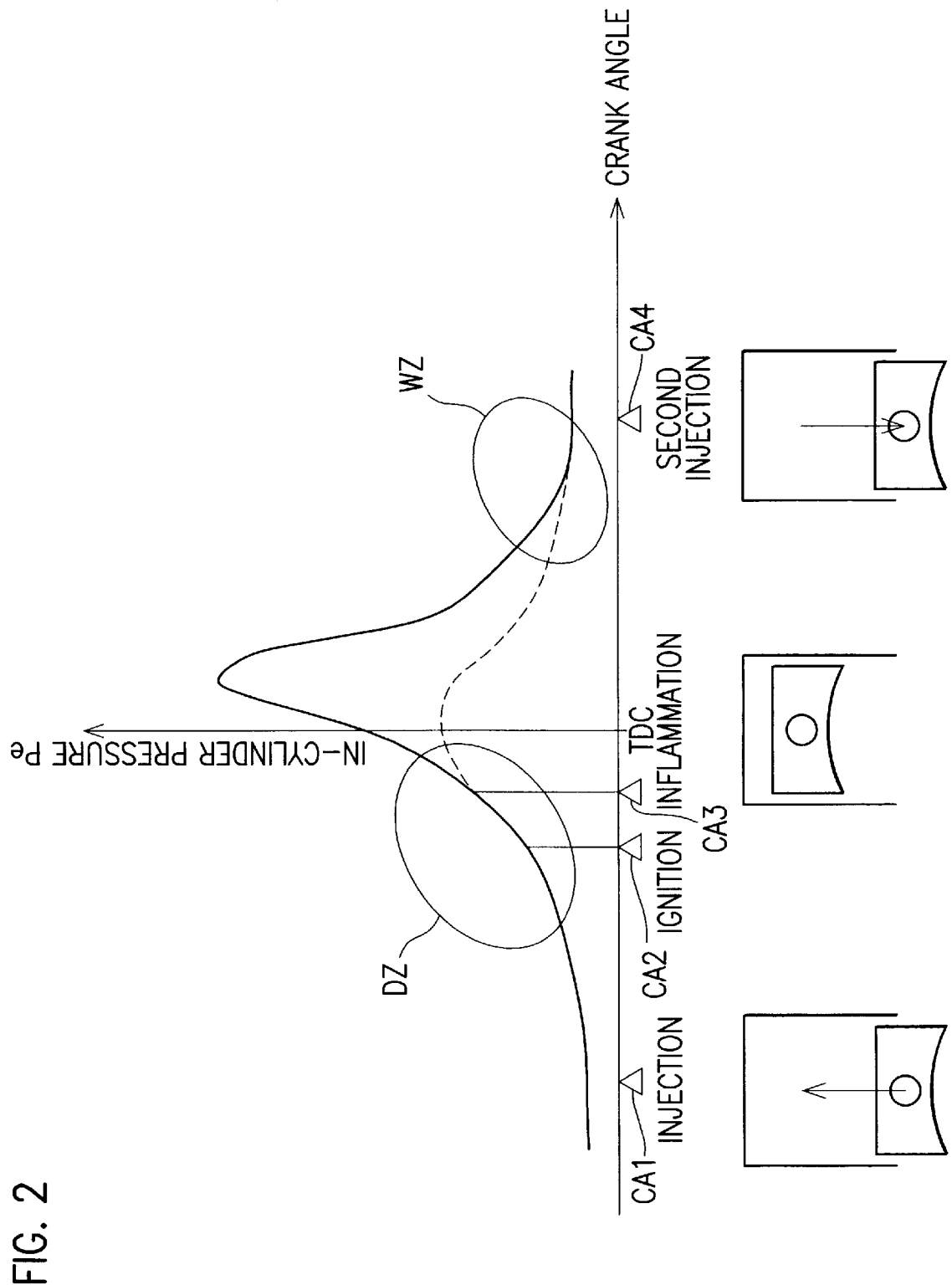
FIG. 2 is a graph showing, as a function of crank angle, the in-cylinder pressure which is observed when an exhaust-gas temperature rising control according to the present invention is carried out.
Figure 3:
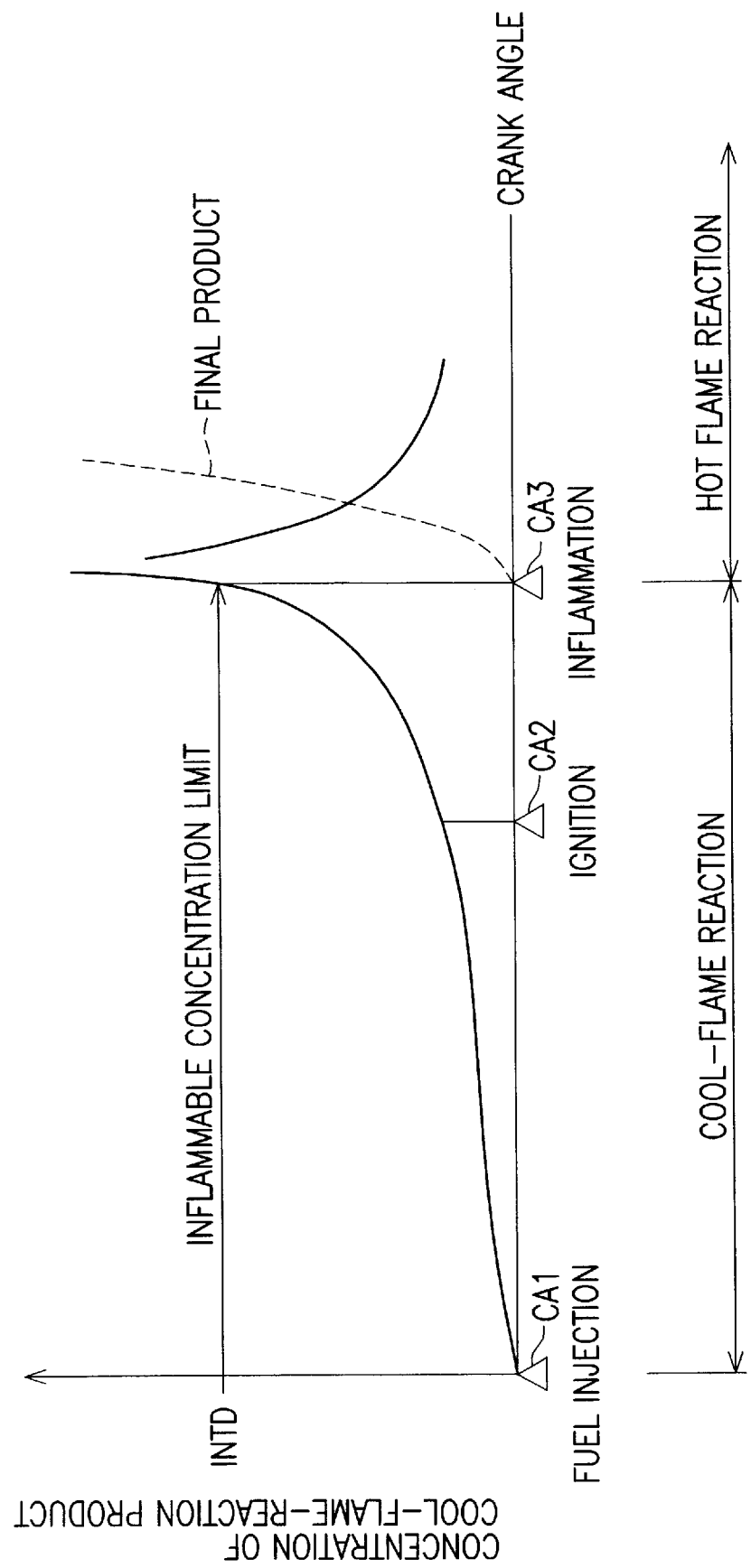
FIG. 3 is a graph showing a change in concentration of cool-flame-reaction product in a combustion chamber, which is observed in a main-fuel combustion area shown by the oval DZ in FIG. 2.
Figure 4:
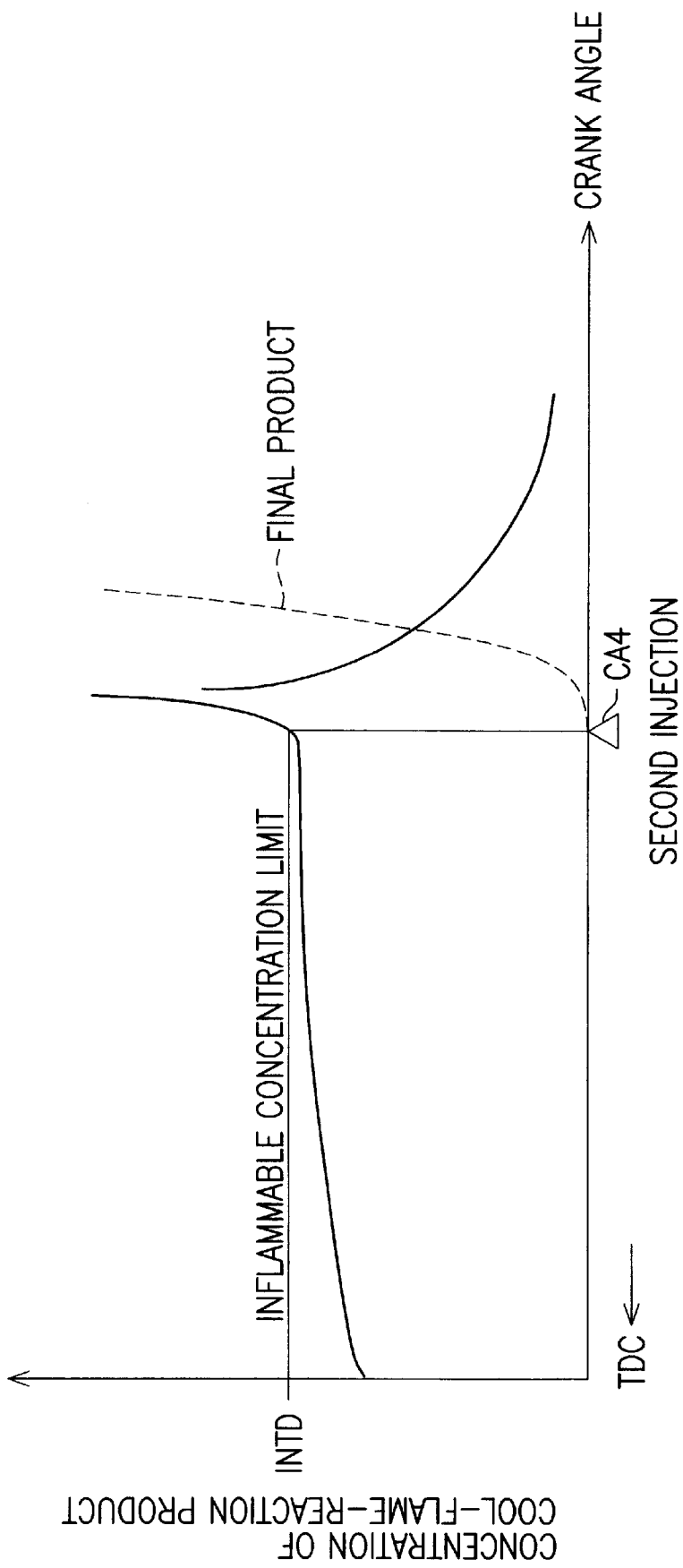
FIG. 4 is a graph showing a change in concentration of cool-flame-reaction product observed in an additional-fuel combustion area shown by the oval WZ in FIG. 2.
Figure 5:
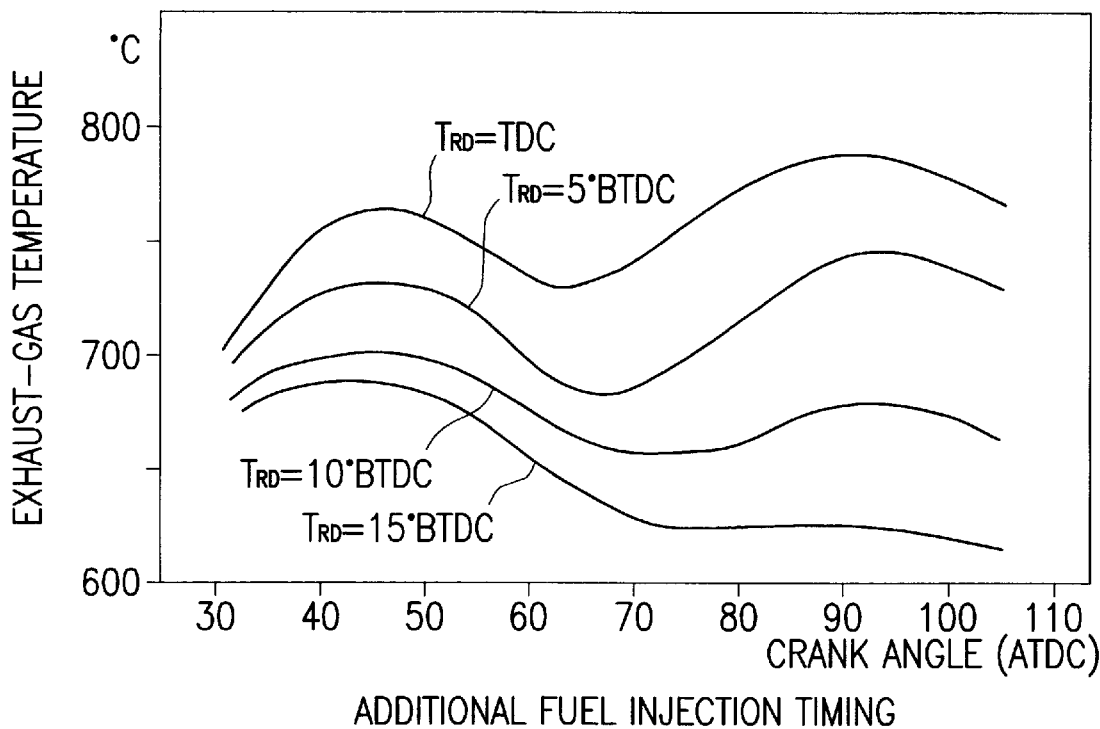
FIG. 5 is a graph showing a relationship among ignition timing TRD, exhaust-gas temperature, and additional fuel injection timing, determined on the basis of experiments in which the main-fuel injection quantity was set to a value making the air-fuel ratio equal to 30.
Figure 6:
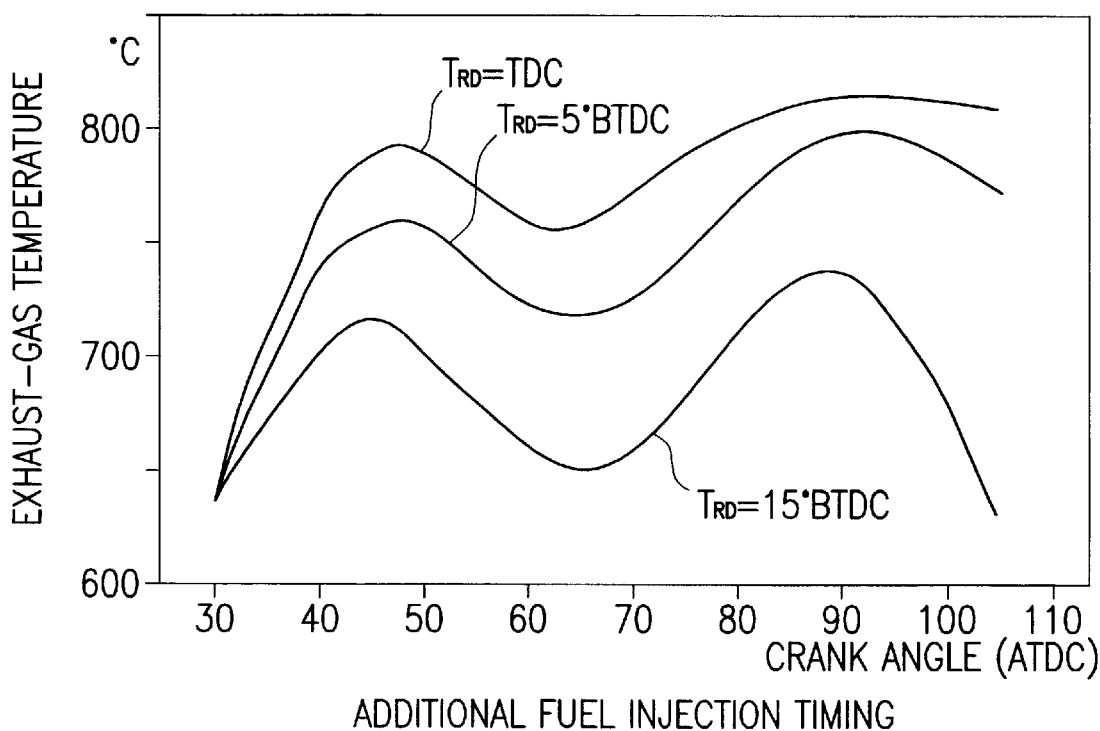
FIG. 6 is a graph showing a relationship among ignition timing TRD, exhaust-gas temperature, and additional-fuel injection timing, in a case where the quantity of main fuel injection is set to a value making the air-fuel ratio equal to 40.
Figure 7:
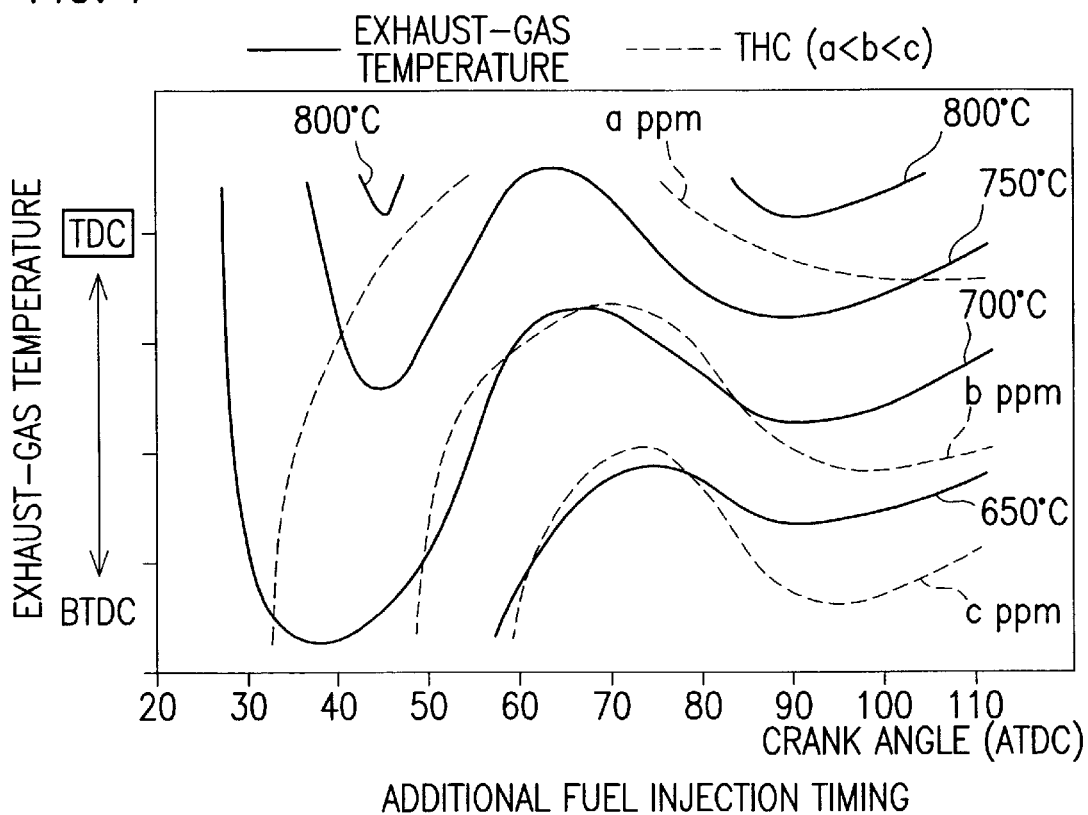
FIG. 7 is a graph showing a relationship among exhaust-gas temperature, ignition timing TRD, and additional-fuel injection timing, and a relationship among unburnt hydrocarbon quantity in exhaust gas, ignition timing TRD, and additional-fuel injection timing, determined on the basis of the experiments associated with FIG. 5.

As is clear from the comparison between FIGS. 5 and 6, if, in order to increase the exhaust-gas temperature with the aid of the supply of additional fuel, a two-step combustion is performed, in which combustion of the main fuel is followed by combustion of the additional fuel, it is advisable to set the air-fuel ratio at the time of main fuel injection to such a large value in the order of 40 in obtaining a greater exhaust-gas temperature raising effect. However, when the engine temperature is low, a stable combustion of a lean air-fuel mixture having an air-fuel ratio of approximately 40 may not be achieved.

In the present embodiment, when the engine temperature is low, a target air-fuel ratio AF is set to such a value which permits the combustion of main fuel to be stabilized. When the engine temperature is not low, the target air-fuel ratio AF is set to a value greater than the value at the time of low engine temperature, to thereby improve the exhaust-gas temperature raising effect. Furthermore, the target air-fuel ratio AF is changed according to the engine operating state.

Figure 13:
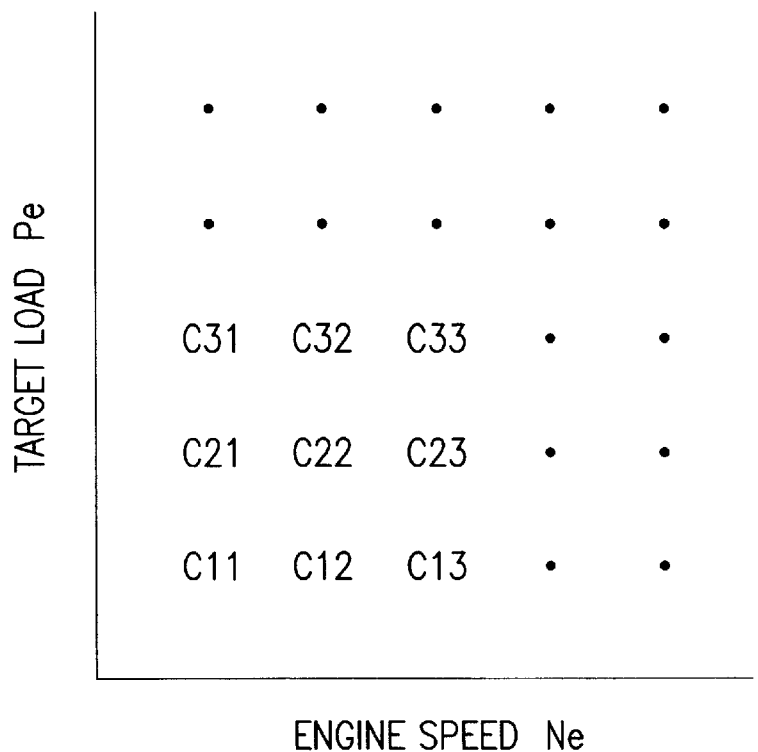
FIG. 13 is a view showing a first leaning map which is used to set a target air-fuel ratio at the time of combustion of main fuel in a case where the engine cooling water temperature is low on an occasion that the exhaust-gas temperature is raised.

More specifically, in the present embodiment, in an attempt to make it easy to set the target air-fuel ratio AF suitable for engine temperature, the target air-fuel ratio AF at the time of low engine temperature is experimentally determined beforehand for each engine operating state (for each combination of engine speed Ne and target mean effective pressure Pe). On the basis of experimental results thus obtained, a first leaning map (AF=f (Ne, Pe)) for low engine temperature shown in FIG. 13 is prepared and is stored in the memory of the ECU 23. Further, a second leaning map (FIG. 14) for ordinary engine temperature is prepared as in the case of the first leaning map, and is stored in the memory. Either one of the first and second maps is selected according to the engine cooling water temperature Tw.

Values $C_{ij}$ (i=1, 2, 3, . . . ; j=1, 2, 3, . . . ) of the target air-fuel ratio AF in the first leaning map are set to be smaller than values $D_{ij}$ of the target air-fuel ratio AF in the second leaning map. The values C and D with the same subscripts ij are used in the same engine operating state (except for the cooling water temperature Tw). For example, C22 of the first leaning map is set to 30, and D22 of the second leaning map, used in the same engine operating state as C22, is set to 40.

If the discrimination result at step S18 is affirmative, that is, if the cooling water temperature Tw is lower than the discrimination temperature Two, the target air-fuel ratio AF is read out, at step S20, from the first leaning map shown in FIG. 13 on the basis of target load Pe and engine speed Ne. The target mean effective pressure Pe, which is interrelated with an engine output desired by the driver, can be represented as a function of throttle opening $\theta$th and engine speed Ne. In the present embodiment, the target mean effective pressure Pe, used at the time of reading out the target air-fuel ratio from the leaning map, is read out from a target mean effective pressure map, not shown, previously prepared and stored in the memory.

Figure 14:
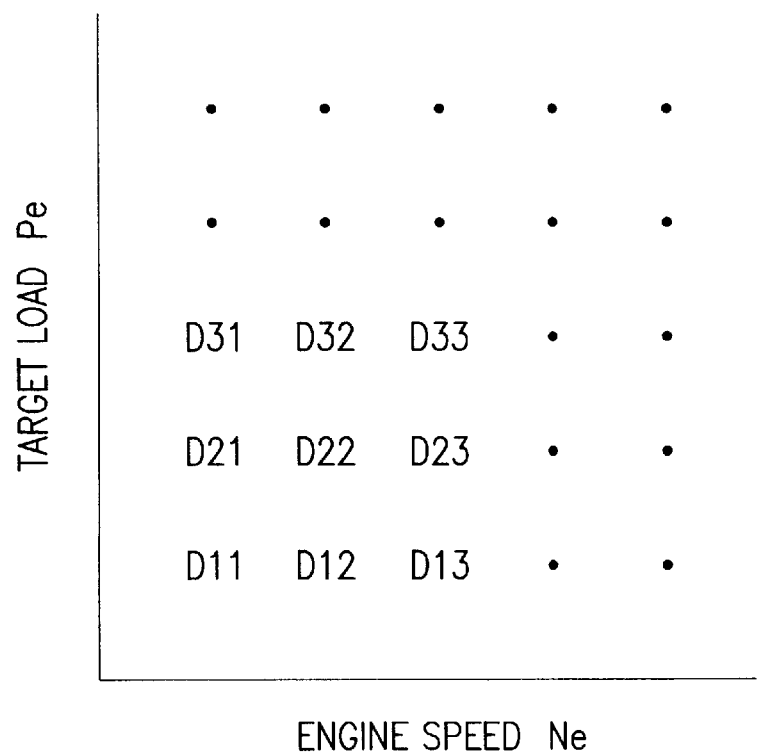
FIG. 14 is a view showing a second leaning map which is used to set the target air-fuel ratio in a case where the engine cooling water temperature is not low.

If the discrimination result at step S18 is negative, that is, if the cooling water temperature Tw is equal to or higher than the discrimination temperature Two, it is judged that there is no possibility of unstable combustion, and the program proceeds to step S22 in which the target air-fuel ratio AF is read out from the second leaning map shown in FIG. 14 on the basis of target load Pe and engine speed Ne.

Accordingly, if the engine cooling water temperature Tw is lower than the discrimination temperature Two, the target air-fuel ratio AF is set to a value $C_{ij}$ smaller than the value Dij at the time when the cooling water temperature Tw is equal to or higher than the discrimination temperature Two, whereby a main fuel combustion can be stabilized.

Next, at step S24, by using the target air-fuel ratio AF read out from the first or the second leaning map, a main fuel injection time (valve opening time of the fuel injection valve 8) Tinjm is calculated in accordance with the following equation (M1):

$$Tinjm = K \times (Qa \times \gamma / AF) \times (Kwt \times Kaf \ldots) \times Kg + TDEC \quad (M1)$$

where K is a conversion factor (constant) to convert fuel quantity into valve opening time; Qa is a volumetric intake air flow rate per intake stroke; $\gamma$ is an intake air density; AF is the target air-fuel ratio read out at step S24; Kwt, Kaf . . . are various correction factors set according to engine water temperature Tw and the like; Kg is a gain correction factor for the injection valve 8; TDEC is a dead-time correction value set according to target mean effective pressure Pe and engine speed Ne.

Following the calculation of the main fuel injection time Tinjm, an additional fuel injection time Tinja is calculated at step S26 in accordance with the following equation (M2):

$$Tinja = K \times Qa \times \gamma \{(1/\text{stoichiometric } AF) - (1/AF)\} \times (Kwt \times Kaf \ldots) \times Kg + TDEC \quad (M2)$$

where stoichiometric AF indicates the stoichiometric air-fuel ratio (14.7), and AF indicates the target air-fuel ratio read out at step S24.

In the present embodiment, as is clear from equation (M2), the additional fuel injection time Tinja, i.e., the additional fuel injection quantity is set basically in dependence on the oxygen quantity (Qa×γ{(1/stoichiometric AF)−(1/AF)}), which remains in the cylinder after the main combustion. The thus set injection time is corrected according to the engine operating state such as engine cooling water temperature Tw (corresponding to the correction factor Kwt and the like). That is, the setting of the additional fuel injection quantity is made in such a manner that an air-fuel ratio per one cycle for each cylinder, which ratio is determined by a whole fuel injection quantity (the sum of the main-fuel injection quantity and the additional-fuel injection quantity) per one cycle for each cylinder and the intake air quantity Qa per one cycle for each cylinder, becomes equal to a total target air-fuel ratio which is determined by a specified air-fuel ratio (here, the stoichiometric air-fuel ratio) suitable for obtaining the exhaust-gas temperature raising effect and the engine operating state such as cooling water temperature Tw. In other words, the additional fuel injection quantity is set such that the air-fuel ratio per one cycle for each cylinder becomes equal to the total target air-fuel ratio which varies, around the specified air-fuel ratio, according to the engine operating state. For example, in order to stabilize the main combustion when the engine runs at a speed of 1500 rpm, it is preferable to set the target air-fuel ratio to a value, which is slightly shifted toward the leaner side relative to the stoichiometric air-fuel ratio (for example, about 15).

Following the calculation of the main-fuel injection quantity and the additional-fuel injection quantity, the main fuel injection and the ignition are performed at step S28.

It is preferable to start the main fuel injection at that timing, which permits the air-fuel mixture to reach the vicinity of the spark plug at the moment at which optimum ignition can be made stably. In the present embodiment, the main-fuel injection start timing is determined according to the ignition timing $\theta$ RD set at step S16 by referring to a map, in which the main-fuel injection start timing is previously set as a function of ignition timing $\theta$ RD. At the thus set main-fuel injection start timing in the compression stroke, the fuel injection valve 8 is driven to open, to thereby start the injection of the main fuel.

Next, the program advances to step S30, in which the additional fuel injection is performed at a specified timing in a middle stage of expansion stroke. In view of the experimental results shown in FIGS. 5 to 7, the start timing of additional fuel injection may be fixed at a specific timing, for example, 90° ATDC in terms of crank angle, in the middle stage of expansion stroke. In the present embodiment, considering that the most suitable timing to start the additional fuel injection, at which the largest exhaust-gas temperature raising effect is obtainable, changes according to the engine operating environmental conditions such as atmospheric pressure Pa and intake air temperature Ta, the most suitable timing to start the additional fuel injection for every engine operating environmental condition is experimentally set beforehand and stored in the memory of the ECU 23 in the form of a map (not shown). By referring to the map, the most suitable timing to start the additional fuel injection is set according to the atmospheric pressure Pa and the like.

The ECU 23 waits for the arrival of the thus set additional-fuel injection start timing, and drives the fuel injection valve 8 to open to thereby inject the additional fuel. At the time of the additional fuel injection, in the lean air-fuel mixture portion formed in the combustion chamber 1a by the main fuel injection, the cool-flame-reaction product still remains which has a concentration close to the inflammable concentration limit. Then, new cool-flame-reaction product is produced from the additional fuel injected into the high-temperature atmosphere in the cylinder, so that the concentration of the whole cool-flame-reaction product including the remaining cool-flame-reaction product and the new cool-flame-reaction product, exceeds the inflammable concentration limit. Therefore, the additional fuel is enflamed by self-inflammation, and the combustion of the additional fuel is started. Thermal energy produced by the additional fuel combustion surely raises the exhaust-gas temperature, without being wasted for the expansion work.

In the following, an exhaust-gas temperature raising system according to a second embodiment of the present invention will be described.

As distinct from the first embodiment in which, on a occasion of setting the target air-fuel ratio AF at the time of main combustion, either the first or the second leaning map is selected according to whether the engine cooling water temperature Tw is lower than the discrimination temperature Two, the present embodiment determines the target air-fuel ratio AF at the time of main combustion by determining a basic target air-fuel ratio from one map similar to the first and the second leaning maps, and by multiplying the basic target air-fuel ratio by a correction factor KL which varies in dependence on the water temperature Tw. That is, the exhaust-gas temperature raising system of the present embodiment is different from the first embodiment in the process of exhaust-gas temperature raising control, and is the same as the first embodiment in other points.

The process of exhaust-gas temperature raising control of the present embodiment will be explained with reference to the flowchart shown in FIG. 15.

Figure 15:
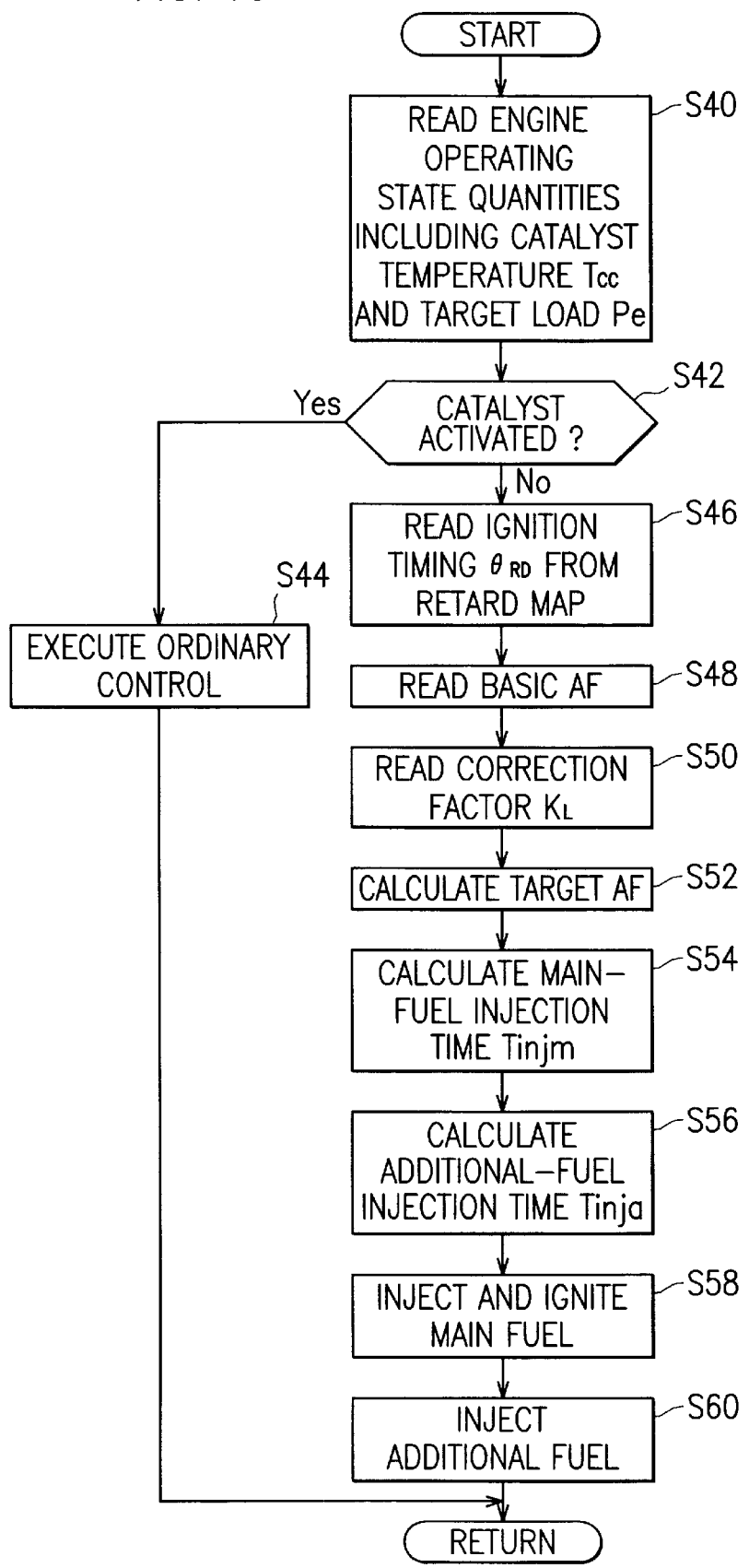
FIG. 15 is a flowchart showing procedures of an exhaust-gas temperature raising control according to a second embodiment of the present invention.

Steps S42 to S46 and steps S54 to S60 of the exhaust gas temperature raising control routine shown in FIG. 15 are substantially the same as steps S10 to S16 and steps S24 to S30 of the flowchart of FIG. 12, respectively, and the description as for these steps will be partially omitted.

Figure 16:
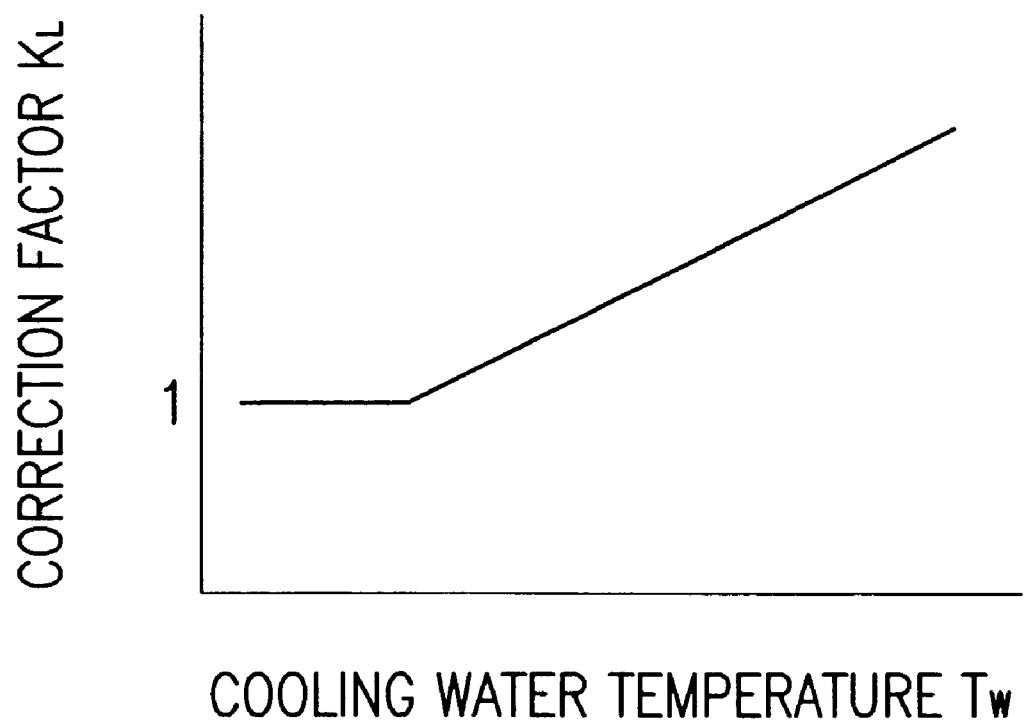
FIG. 16 is a view showing a map of a correction factor KL used to correct a basic target air-fuel ratio.
Figure 17:
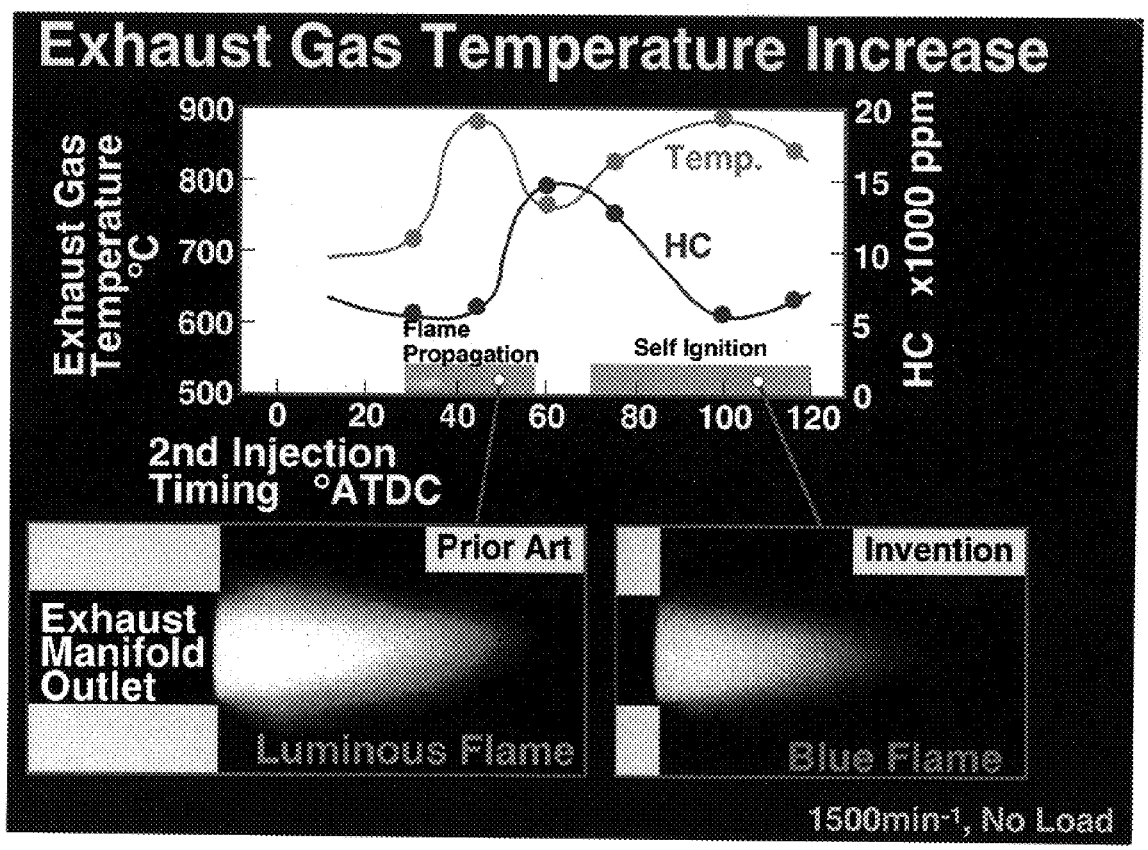
FIG. 17 is a view showing the exhaust-gas temperature and the unburnt hydrocarbon concentration in exhaust gas as a function of additional-fuel injection timing, and showing a luminous flame and a blue flame observed at an exhaust manifold outlet when the additional-fuel injection is made in an early stage of expansion stroke and when it is made in a latter stage of expansion stroke, respectively.

At step S40, the ECU23 reads various engine operating state quantities including target load Pe in addition to catalyst temperature Tcc, cooling water temperature Tw, intake air flow rate Qa, throttle opening θth, engine speed Ne, atmospheric pressure Pa, intake air temperature Ta, and the like. If it is judged at step S42 that the catalyst temperature Tcc is lower than the catalyst-activity discrimination temperature Tcw and that the condition to prohibit the exhaust-gas temperature raising control is not satisfied, the ignition timing θ RD is read out from the retard map at step S46. The program advances to step S48 where a basic target air-fuel ratio (basic AF) is read from a basic target air-fuel ratio map for the exhaust-gas temperature raising control. This map is set beforehand in a similar manner as the first leaning map in FIG. 13. Next, at step S50, a correction factor KL is read from a correction factor map shown in FIG. 16. The correction factor KL is used to correct the basic target air-fuel ratio, read at step 48, in accordance with the cooling water temperature Tw. In the correction factor map, the correction factor KL is set in such a manner that it takes a value of 1 in a water-temperature range where the cooling water temperature Tw is equal to or lower than a preset temperature TW1 corresponding to the discrimination temperature Two in the first embodiment, and it takes a value, which increases as the water temperature Tw increases, in a water-temperature range where the water temperature Tw exceeds the preset temperature TW1.

At step S52, a target air-fuel ratio (target AF) is calculated by using the basic target air-fuel ratio and the correction factor KL, according to the following equation (N1):

target air-fuel ratio=(basic target air-fuel ratio)×(correction factor KL)  (N1)

The value of the target air-fuel ratio becomes larger as the cooling water temperature Tw increases beyond the preset temperature TW1.

Next, at step S54 and thereafter, the same processing as that at step S24 and thereafter of the flowchart in FIG. 12, is performed.

The present invention is not limited to the first and second embodiments, and can be modified variously.

For example, in the aforementioned exhaust-gas temperature raising control, the additional fuel injection quantity is set to such a value as to cause the whole air-fuel ratio per one cycle for each cylinder, obtained when the main fuel injection and the additional fuel injection are performed in sequence, to become equal to the target air-fuel ratio, which varies around a specified air-fuel ratio (preferably, the stoichiometric air-fuel ratio) in dependence on the engine operating state. However, it is not essential to set the additional fuel injection quantity by means of the just-mentioned setting method. In some cases, the whole air-fuel ratio per one cycle for each cylinder may be smaller or greater than the stoichiometric air-fuel ratio. Furthermore, the additional fuel injection quantity may be fixedly set to a constant injection quantity so long as the additional fuel is permitted to be combusted.

In the above-mentioned exhaust-gas temperature raising control, the ignition timing in respect of the main fuel is delayed relative to the ignition timing for the ordinary engine operation, to thereby perform a slow combustion, whereby the concentration of the cool-flame-reaction product, which remains in the cylinder in a middle stage of or a subsequent stage of expansion stroke, is controlled to a value close to the inflammable concentration limit. However, it is not essential to delay the ignition timing, associated with the main fuel, in the exhaust-gas temperature raising control. For example, it is also effective to simply make the air-fuel ratio lean at the time of main combustion to the extent that it has a value equal to or greater than 35. In this case, the main fuel is slowly burnt, and the concentration of the cool-flame-reaction product in a middle stage of or a subsequent stage of expansion stroke is controlled to a value close to the inflammable concentration limit.

In effecting the additional fuel injection, it is not inevitably necessary to perform the injection at a time. The additional fuel injection may be divided and made a plurality of times.

Moreover, the additional fuel injection may be performed for all the cylinders, or may be made only for one or more specific cylinders.

In the foregoing embodiments, it is determined that the exhaust-gas temperature raising control should be made when the catalyst temperature Tcc detected by the catalyst temperature sensor 26 is lower than the catalyst-activity discrimination temperature Tcw. Alternatively, it is possible to estimate the catalyst temperature based on associated signals from various sensors for detecting the engine operating state, and perform the exhaust-gas temperature raising control when the thus estimated catalyst temperature is lower than the catalyst-activity discrimination temperature. Furthermore, in order to make the control simple, it is possible to perform the exhaust-gas temperature raising control when the engine temperature (cooling water temperature) detected by engine temperature detecting means after the engine start-up exceeds a set temperature, or when it is detected by elapse-time detecting means that a variable or fixed predetermined time period, which is set according to, e.g., the water temperature at the time of engine start-up, has elapsed from the time when the engine was started.

Furthermore, it is possible to carry out the exhaust-gas temperature raising control for a specified time period when the engine is operated in a condition where the catalyst may become inactive, so that either one of the following requirements (1) to (3) is satisfied:

(1) when the engine speed has exceeded a specified engine speed after the engine start-up, or when a certain time period required for the engine speed to be stabilized has elapsed since the engine start-up;

(2) the engine control in the stratified-combustion mode is being performed, and a stationary engine operation in which the throttle opening degree does not change greatly is being performed;

(3) the idle operation after restoration from the fuel-cut area is being performed.

In the first embodiment, if the catalyst is inactive, the target air-fuel ratio is read out from the first or second leaning map according to the water temperature, and then the main-fuel injection quantity and the like are set in such a manner that the target air-fuel ratio may be attained. Alternatively, it is possible to variably set the ratio of the main-fuel injection quantity to the additional-fuel injection quantity according to water temperature information, without using the map. That is, if the water temperature is low, the main-fuel injection quantity may be increased to stabilize the main combustion, whereas the additional-fuel injection quantity may be increased to shorten a total time period required for the catalyst to be activated, if the water temperature is high.

What is claimed is:

1. An exhaust-gas temperature raising system for an in-cylinder injection type internal combustion engine adapted to inject a main fuel directly into a combustion chamber from a fuel injection valve and to spark-ignite the injected main fuel for lean combustion, comprising:

engine control means for controlling an engine control parameter such that concentration of a cool-flame-reaction product, produced during a process of combustion of the main fuel and remaining in the combustion chamber at a middle stage or a subsequent stage of expansion stroke, approaches an inflammable concentration limit, when the engine is in an operating condition in which an exhaust-gas temperature is required to rise; and additional fuel control means for injecting an additional fuel from the fuel injection valve during the middle stage or the subsequent stage of the expansion stroke such that concentration of an entire cool-flame-reaction product, including the cool-flame-reaction product remaining in the combustion chamber and a cool-flame-reaction product newly produced by a cool-flame reaction of the additional fuel, exceeds the inflammable concentration limit, when the the engine control parameter is controlled by the engine control means, whereby a temperature of an exhaust-gas purification device disposed in an exhaust system of the internal combustion engine is raised.

2. The exhaust-gas temperature raising system according to claim 1, wherein said engine control means includes ignition timing setting means for setting an ignition timing at which the main fuel is ignited to a value falling within a range from 10° before compression top dead center to 5° after compression top dead center in terms of crank angle.

3. The exhaust-gas temperature raising system according to claim 2, wherein said engine control means includes air-fuel ratio control means for setting an air-fuel ratio at the time of combustion of the main fuel to a value which is equal to or greater than 25.

4. The exhaust-gas temperature raising system according to claim 1, wherein said engine control means includes air-fuel ratio control means for setting an air-fuel ratio at the time of combustion of the main fuel to a value which is equal to or greater than 35.

5. The exhaust-gas temperature raising system according to claim 1, wherein said engine control means includes at least one of ignition timing setting means and air-fuel ratio control means, and wherein said engine control means controls an ignition timing at which the main fuel is ignited to a value on a delay side relative to an ignition timing at a time when the engine is not in the operating condition where the exhaust-gas temperature is required to rise, or controls an air-fuel ratio associated with the main fuel to a value on a fuel-leaner side relative to an air-fuel ratio at the time when the engine is not in the operating condition where the exhaust-gas temperature is required to rise.

6. The exhaust-gas temperature raising system according to claim 5, wherein when the engine is not in the operating condition where the exhaust-gas temperature is required to rise, the engine is operated in an intake-stroke lean mode in which a target air-fuel ratio is set to a first air-fuel ratio on a fuel-leaner side relative to a stoichiometric air-fuel ratio and in which fuel is injected from the fuel injection valve mainly during intake stroke, or the engine is operated in a compression-stroke lean mode in which the target air-fuel ratio is set to a second air-fuel ratio on the fuel-leaner side relative to said first air-fuel ratio and in which fuel is injected from the fuel injection valve mainly during compression stroke.

7. The exhaust-gas temperature raising system according to claim 1, wherein said additional fuel control means sets a start timing of injection of the additional fuel to a value falling within a range from 70° to 110° after compression top dead center in terms of crank angle.

8. The exhaust-gas temperature raising system according to claim 1, wherein said engine control means sets an air-fuel ratio associated with the main fuel according to engine temperature.

9. The exhaust-gas temperature raising system according to claim 1, wherein said additional fuel control means sets an injection quantity of the additional fuel so that an air-fuel ratio, calculated from a total fuel injection quantity for one cycle, which is equal to a sum of an injection quantity of the main fuel and the injection quantity of the additional fuel, and a quantity of intake air for one cycle, becomes equal to a target air-fuel ratio which varies in dependence on the operating condition of the engine around a specified air-fuel ratio suitable to effectively raise the exhaust-gas temperature.

10. An exhaust-gas temperature raising method for an in-cylinder injection type internal combustion engine adapted to inject a main fuel directly into a combustion chamber from a fuel injection valve and to spark-ignite the injected main fuel for lean combustion, comprising:

determining whether the engine is in an operating condition in which an exhaust-gas temperature is required to rise;

controlling an engine control parameter such that concentration of a cool-flame-reaction product, produced during a process of combustion of the main fuel and remaining in the combustion chamber at a middle stage or a subsequent stage of expansion stroke, approaches an inflammable concentration limit, when it is determined that the exhaust-gas temperature is required to rise; and injecting an additional fuel from the fuel injection valve during the middle stage or the subsequent stage of the expansion stroke such that concentration of an entire cool-flame-reaction product, including the cool-flame-reaction product remaining in the combustion chamber and a cool-flame-reaction product newly produced by a cool-flame reaction of the additional fuel, exceeds the inflammable concentration limit, when said engine parameter is controlled, whereby an exhaust-gas purification device disposed in an exhaust system of the internal combustion engine is raised in temperature.

* * * * *